US012702616B2

(12) United States Patent
Barilea et al.

(10) Patent No.: US 12,702,616 B2
(45) Date of Patent: Aug. 11, 2026

(54) AIR PULSE GENERATOR

(71) Applicant: Hill-Rom Services PTE. LTD., Singapore (SG)

(72) Inventors: Deny Duay Barilea, Singapore (SG); Yong Guan Tay, Singapore (SG); Mo Chuk Wong, Singapore (SG); Yung Wei Neo, Singapore (SG); Kean Peng Tay, Singapore (SG)

(73) Assignee: Hill-Rom Services PTE. LTD., Singapore (SG)

( * ) Notice: Subject to any disclaimer, the term of this patent is extended or adjusted under 35 U.S.C. 154(b) by 592 days.

(21) Appl. No.: 18/223,072

(22) Filed: Jul. 18, 2023

(65) Prior Publication Data

US 2024/0024188 A1 Jan. 25, 2024

Related U.S. Application Data

(60) Provisional application No. 63/390,365, filed on Jul. 19, 2022.

(51) Int. Cl.
*A61H 9/00* (2006.01)
*A61H 23/04* (2006.01)
(Continued)

(52) U.S. Cl.
CPC ......... *A61H 9/0007* (2013.01); *A61H 9/0078* (2013.01); *A61H 23/04* (2013.01);
(Continued)

(58) Field of Classification Search
CPC .... A61H 2201/0165; A61H 2201/1246; A61H 2201/5056; A61H 9/0007; A61H 9/005;
(Continued)

(56) References Cited

U.S. PATENT DOCUMENTS 4,881,752 A 11/1989 Tanaka
4,922,962 A 5/1990 Jones
(Continued)

FOREIGN PATENT DOCUMENTS

CN 102600037 B 7/2013
CN 111197568 A 5/2020
(Continued)

*Primary Examiner* — Brandy S Lee
*Assistant Examiner* — Sara K Toich
(74) *Attorney, Agent, or Firm* — Price Heneveld LLP

(57) ABSTRACT

An airway clearance therapy system includes a blower and an air pulse generator coupled to the blower. The air pulse generator includes a casing defining a chamber, first and second pistons disposed within the chamber, and a connector assembly coupled to the first and second pistons. A first connecting rod is coupled to the first piston, and a second connecting rod is coupled to the second piston. The air pulse generator also includes dampening pads disposed between the connector assembly and each of the first and second pistons. A motor assembly is operably coupled to the connector assembly. The connector assembly translates rotational motion from the motor assembly to linear motion of the first and second pistons to generate air pulses. A dampener is disposed between the motor assembly and the casing to reduce vibrations transferred between the motor assembly and the casing.

19 Claims, 14 Drawing Sheets

(51) Int. Cl.
*F04B 39/00* (2006.01)
*F04B 39/12* (2006.01)

(52) U.S. Cl.
CPC ...... *F04B 39/0022* (2013.01); *F04B 39/0027* (2013.01); *F04B 39/121* (2013.01); *A61H 2201/0165* (2013.01); *A61H 2201/1246* (2013.01); *A61H 2201/165* (2013.01); *A61H 2205/084* (2013.01)

(58) Field of Classification Search
CPC .... A61H 31/00; A61H 23/00; A61H 23/0254; A61M 16/0006; A61M 16/0057; A61M 16/0063; A61M 16/0072; A61M 2005/2086; F04B 39/0022; F04B 39/0044; F04B 39/121; F16J 15/0818; F16J 1/14
USPC .............................................. 92/84, 215, 143
See application file for complete search history.

(56) References Cited

U.S. PATENT DOCUMENTS

| | | | | | |
|---|---|---|---|---|---|
| 4,939,952 | A * | 7/1990 | Romer | F16C 7/023 | 74/579 E |
| 5,540,052 | A | 7/1996 | Sieke et al. | | |
| 5,551,843 | A | 9/1996 | Hauser | | |
| 5,569,170 | A * | 10/1996 | Hansen | A61H 9/0078 | 601/149 |
| 7,736,324 | B1 | 6/2010 | Helgeson | | |
| 8,734,370 | B1 * | 5/2014 | Ignagni | A61H 23/0263 | 601/149 |
| 2004/0097849 | A1 * | 5/2004 | Van Brunt | A61H 9/0078 | 601/44 |
| 2006/0034711 | A1 * | 2/2006 | Bergner | F04B 35/045 | 417/417 |
| 2010/0068078 | A1 * | 3/2010 | Lee | F16F 15/06 | 417/313 |
| 2021/0137779 | A1 * | 5/2021 | Ayu | A61H 9/0078 | |
| 2022/0168523 | A1 * | 6/2022 | Griffiths | A61M 16/0072 | |

FOREIGN PATENT DOCUMENTS

| | | | |
|---|---|---|---|
| CN | 210785824 | U | 6/2020 |
| KR | 20140103477 | A | 8/2014 |

* cited by examiner

AIR PULSE GENERATOR

CROSS-REFERENCE TO RELATED APPLICATION

This application claims priority to and the benefit under 35 U.S.C. § 119(e) of U.S. Provisional Application No. 63/390,365, filed on Jul. 19, 2022, entitled "AIR PULSE GENERATOR," the disclosure of which is hereby incorporated herein by reference in its entirety.

FIELD OF THE DISCLOSURE

The present disclosure generally relates to an air pulse generator, and more particularly to an air pulse generator for an airway clearance system for providing patient therapy.

SUMMARY OF THE DISCLOSURE

According to one aspect of the present disclosure, an air pulse generator for a patient therapy system includes a casing and first and second pistons disposed within the casing. A connector assembly is coupled to each of the first and second pistons including a first connecting rod coupled to the first piston via a first hinge assembly and a first dampening pad disposed between the first piston and the first hinge assembly to reduce sound translation between the first hinge assembly and the first piston. The connector assembly also includes a second connecting rod coupled to the second piston via a second hinge assembly and a second dampening pad disposed between the second piston and the second hinge assembly to reduce sound translation between the second hinge assembly and the second piston. A motor assembly is operably coupled to the connector assembly. The motor assembly drives movement of the first and second connecting rods to, consequently, drive motion of the first and second pistons to oscillate air within the casing.

According to another aspect of the present disclosure, an air control assembly for an airway clearance system includes a casing and first and second pistons disposed within the casing. A connector assembly is coupled to each of the first and second pistons. A motor assembly is operably coupled to the connector assembly. The motor assembly includes a motor operably coupled to the connector assembly. The connector assembly is configured to translate rotational motion from the motor to linear motion of the first and second pistons between expanded and retracted positions to oscillate air within the casing. The motor assembly also includes a bracket coupled to the motor and a dampener disposed between the bracket and the casing to reduce translation of vibrations caused by the motor to reduce noise generation.

According to another aspect of the present disclosure, an airway clearance therapy system includes a blower and an air pulse generator operably coupled to the blower. The air pulse generator includes a casing defining an interior chamber, first and second pistons disposed within the interior chamber, and a connector assembly coupled to the first and second pistons. A first connecting rod is coupled to the first piston, and a second connecting rod is coupled to the second piston. The first connecting rod is coupled to the second connecting rod. The air pulse generator also includes dampening pads disposed between the connector assembly and the first and second pistons, respectively. A motor assembly is operably coupled to the connector assembly. The connector assembly translates rotational motion from the motor assembly to linear motion of the first and second pistons to generate air pulses. A dampener is disposed between the motor assembly and the casing to reduce vibrations transferred between the motor assembly and the casing.

These and other features, advantages, and objects of the present disclosure will be further understood and appreciated by those skilled in the art by reference to the following specification, claims, and appended drawings.

DETAILED DESCRIPTION

Figure 1:
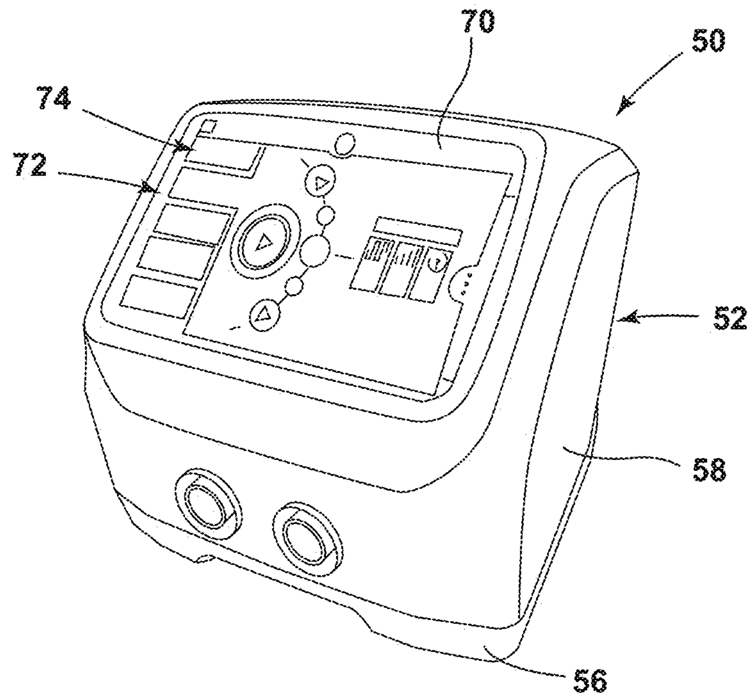
FIG. 1 is a side perspective view of an air control assembly for an airway clearance system, according to the present disclosure.

The present illustrated embodiments reside primarily in combinations of method steps and apparatus components related to an air pulse generator. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to a surface closest to an intended viewer, and the term "rear" shall refer to a surface furthest from the intended viewer. However, it is to be understood that the disclosure may assume various alternative orientations, except where expressly specified to the contrary. It is also to be understood that the specific structures and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-18, reference numeral 10 generally designated an air pulse generator for a patient therapy system 12 includes first and second pistons 14, 16 and a connector assembly 18 coupled to the first and second pistons 14, 16. The connector assembly 18 includes a first connecting rod 20 coupled to the first piston 14 via a first hinge assembly 22. A first dampening pad 24 is disposed between the first piston 14 and the first hinge assembly 22 to reduce translation of vibration between the first hinge assembly 22 and the first piston 14. The connector assembly 18 also includes a second connecting rod 26 coupled to the second piston 16 via a second hinge assembly 28. The second connecting rod 26 is coupled to the first connecting rod 20. A second dampening pad 30 is disposed between the second piston 16 and the second hinge assembly 28 to reduce translation of vibration between the second hinge assembly 28 and the second piston 16. A motor assembly 32 is operably coupled to the connector assembly 18. A dampener 34 is disposed adjacent to the motor assembly 32 to reduce translation of vibration from the motor assembly 32. The motor assembly 32 drives movement of the first and second connecting rods 20, 26 to, consequently, drive motion of the first and second pistons 14, 16 to generate air pulses.

Figure 2:
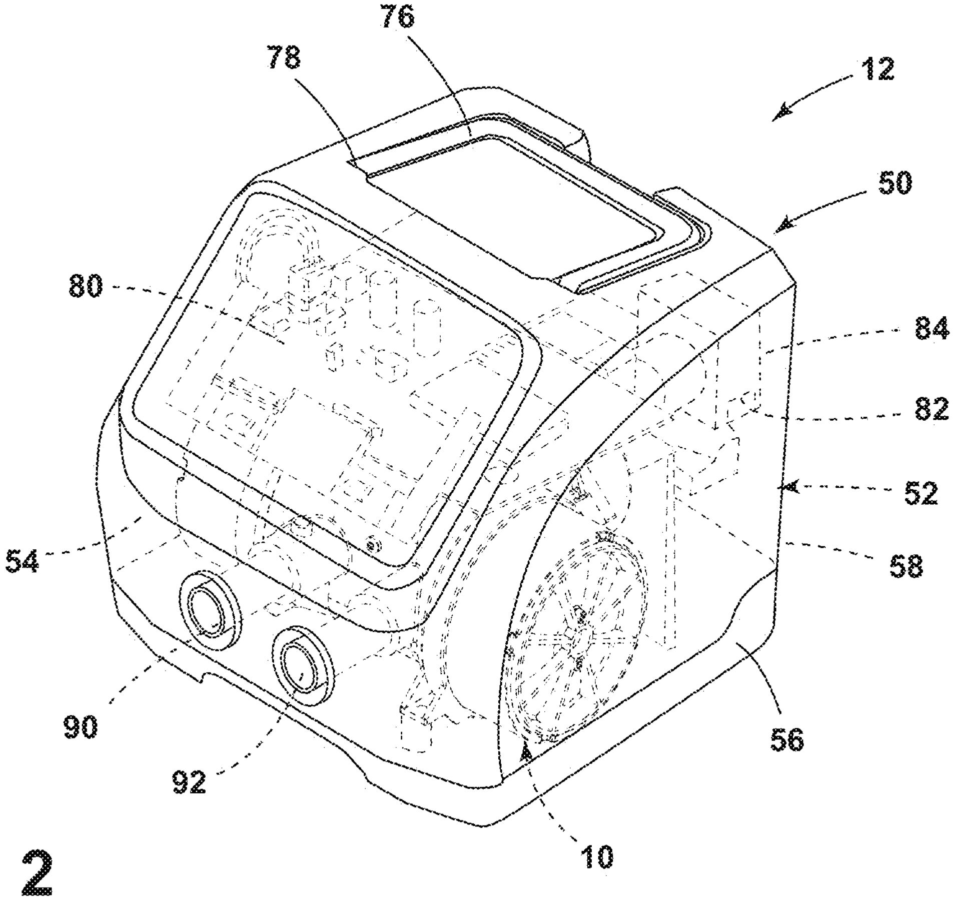
FIG. 2 is a side perspective view of an air control assembly with an air pulse generator illustrated in phantom within an interior thereof, according to the present disclosure.

Referring to FIGS. 1 and 2, the air pulse generator 10 is included in an air control assembly 50 for the patient therapy system 12. Generally, the air control assembly 50 is part of the patient therapy system 12, which is also referred to as an airway clearance system 12, such as a high-frequency chest wall oscillation (HFCWO) system 12 (i.e., the patient therapy system 12). The air control assembly 50 includes a housing 52 defining an interior 54, and the air pulse generator 10 is disposed within the interior 54. The housing 52 includes a base 56 coupled to an upper shell 58, which collectively define the interior 54. The base 56 operates as a floor for components within the housing 52, and the upper shell 58 is disposed over the interior components. Generally, the upper shell 58 forms a substantial portion of the housing 52.

The air control assembly 50 includes a user interface 70 on the upper shell 58. The user interface 70 is configured to receive inputs from a caregiver or patient related to a therapy program and the control of the air control assembly 50. In the illustrated configuration, the user interface 70 includes program options 72, which each relate to predefined settings for the airway clearance or HFCWO therapy. The user interface 70 also includes a manual setting 74 for manually selecting various settings, such as intensity, frequency, time, pressure, etc.

The housing 52 includes a handle 76, which is coupled to a top of the upper shell 58. The handle 76 is configured to rotate between a use position and a stowed position. The housing 52 defines a groove 78 in which the handle 76 is positioned when in the stowed position. The handle 76 provides for convenient transportation of the air control assembly 50 by the caregiver or the patient, which may provide increased convenience in receiving the HFCWO therapy.

Referring still to FIGS. 1 and 2, the air control assembly 50 includes a controller 80, which may include one or more circuits or a circuit board. The controller 80 is communicatively coupled with the user interface 70 and the air pulse generator 10. The controller 80 is configured to receive the user input from the user interface 70 and control the air pulse generator 10 accordingly. The air control assembly 50 also includes a fan 82 operably coupled with the controller 80. The fan 82 is generally disposed in a rear of the housing 52, on an opposing side relative to the user interface 70, and aligned with a vent 84 defined in the housing 52. The fan 82 is configured to direct air out of the housing 52 through the vent 84, which reduces heat proximate to the electronic components within the housing 52. Accordingly, the fan 82 may be utilized to cool various components within the housing 52.

Figure 3:
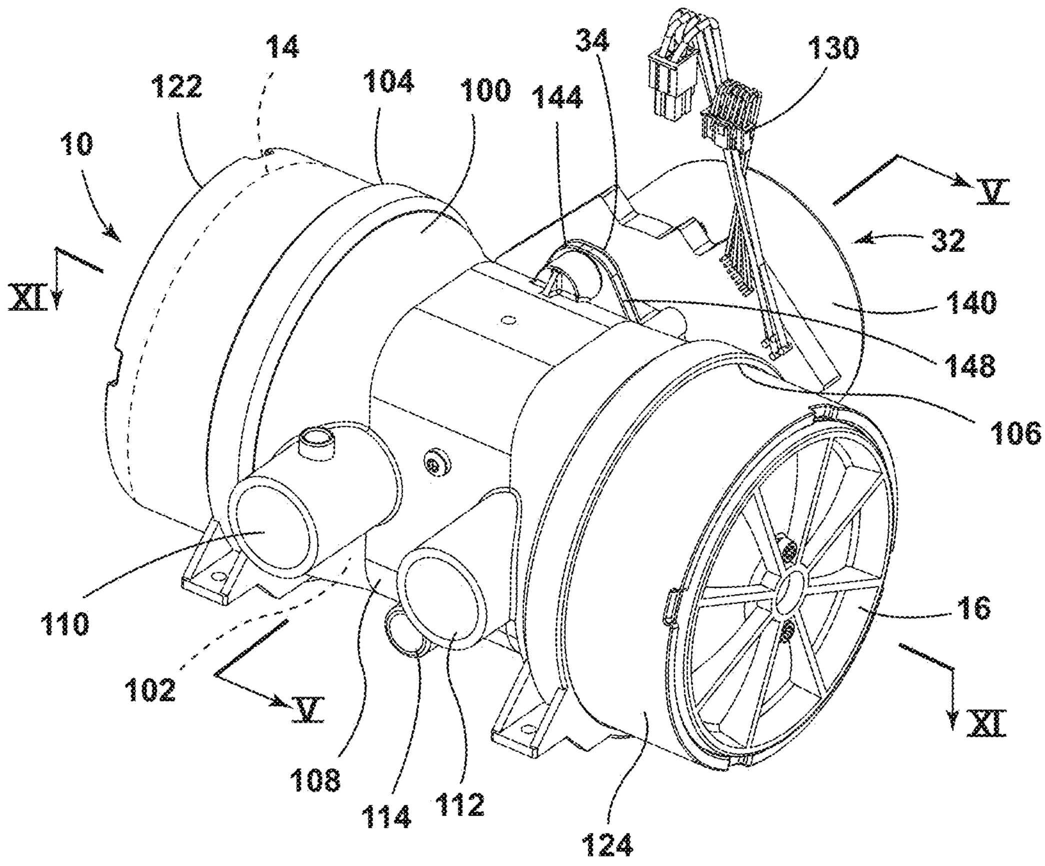
FIG. 3 is a side perspective view of an air pulse generator and a motor assembly for an air control assembly, according to the present disclosure.

Referring still to FIGS. 1 and 2, as well as FIG. 3, the housing 52 defines two outlet ports 90, 92. The outlet ports 90, 92 are in fluid communication with the air pulse generator 10. The outlet ports 90, 92 direct the generated air pulses or oscillated air from the air pulse generator 10 out of the housing 52.

The air pulse generator 10 is disposed within the housing 52 proximate to the outlet ports 90, 92. The air pulse generator 10 includes a casing 100 defining an interior chamber 102. The casing 100 is generally constructed of a plastic material. Additionally, the casing 100 is generally cylindrical. The cylindrical shape of the casing 100 provides curvilinear walls, which may be advantageous to smooth the flow movement within the interior chamber 102, reducing noise and vibration of the air pulse generator 10. Outer ends 104, 106 of the casing 100 have a greater width or diameter than a center portion 108. From the first outer end 104 to the second outer end 106, the casing 100 has a first width that gradually narrows to a second width at the center portion 108 and then gradually widens back to the first width at the second outer end 106. Accordingly, the casing 100 is generally symmetrical over a centerline extending through the motor assembly 32. The center portion 108 has a predefined length that maintains the second width, providing an inner band for the center portion 108 for engaging the motor assembly 32.

The casing 100 includes outlet projections 110, 112 disposed proximate to one another. The outlet projections 110, 112 are in fluid communication with the outlet ports 90, 92 of the housing 52 to direct the generated air pulses or oscillated air from the interior chamber 102, through the outlet ports 90, 92, and out of the housing 52. Additionally, the casing 100 defines an inlet projection 114 proximate to the outlet projections 110, 112. The inlet projection 114 is disposed or centered between the two outlet projections 110, 112. In the illustrated configuration, the inlet projection 114 is smaller than the outlet projections 110, 112 and disposed lower than the outlet projections 110, 112. The inlet projection 114 is in fluid communication with a blower 120 (FIG. 8) for directing air into the interior chamber 102.

Figure 4:
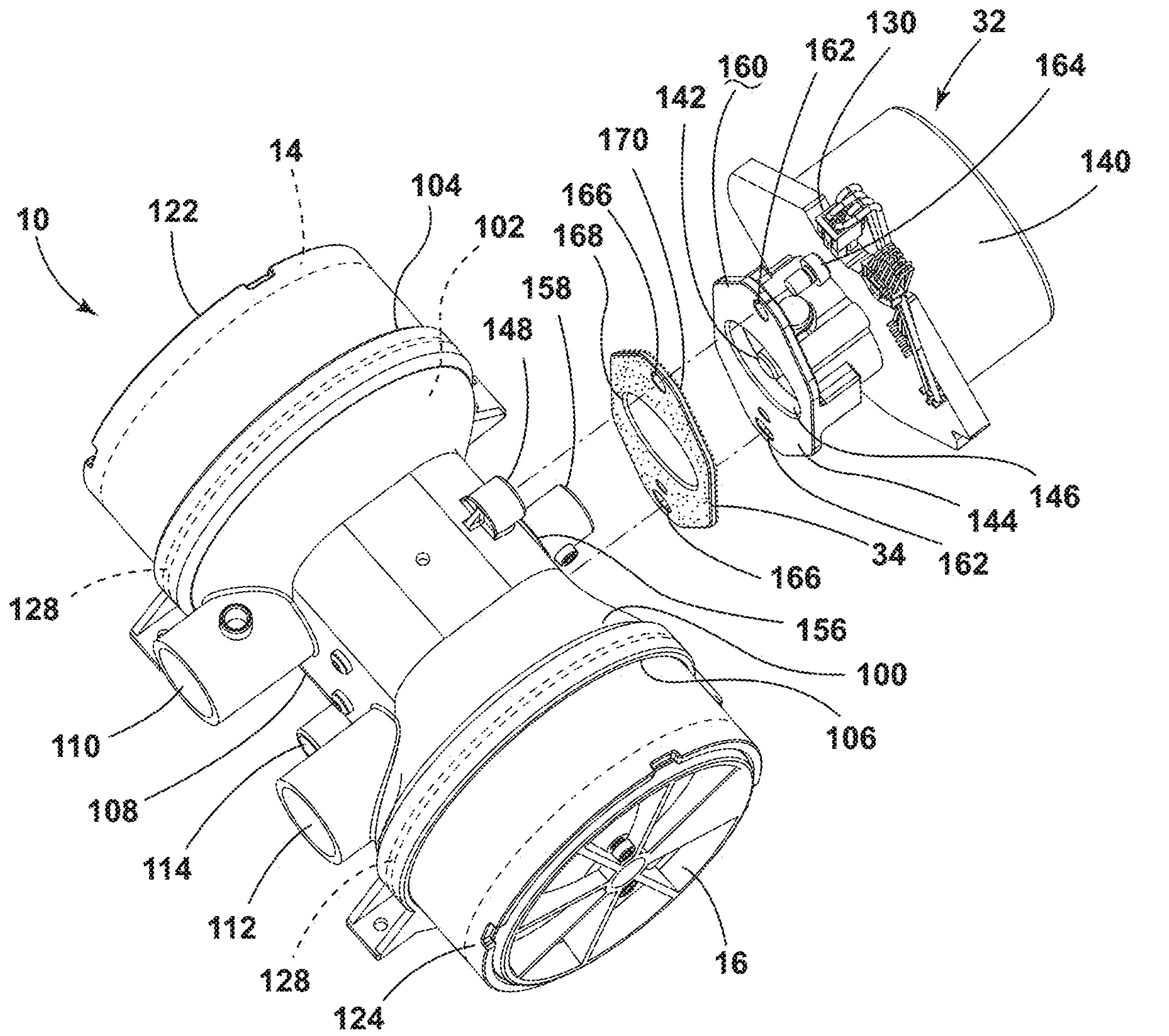
FIG. 4 is a side perspective partially exploded perspective view of an air pulse generator and a motor assembly with a dampener disposed between the motor assembly and the air pulse generator, according to the present disclosure.
Figure 5:
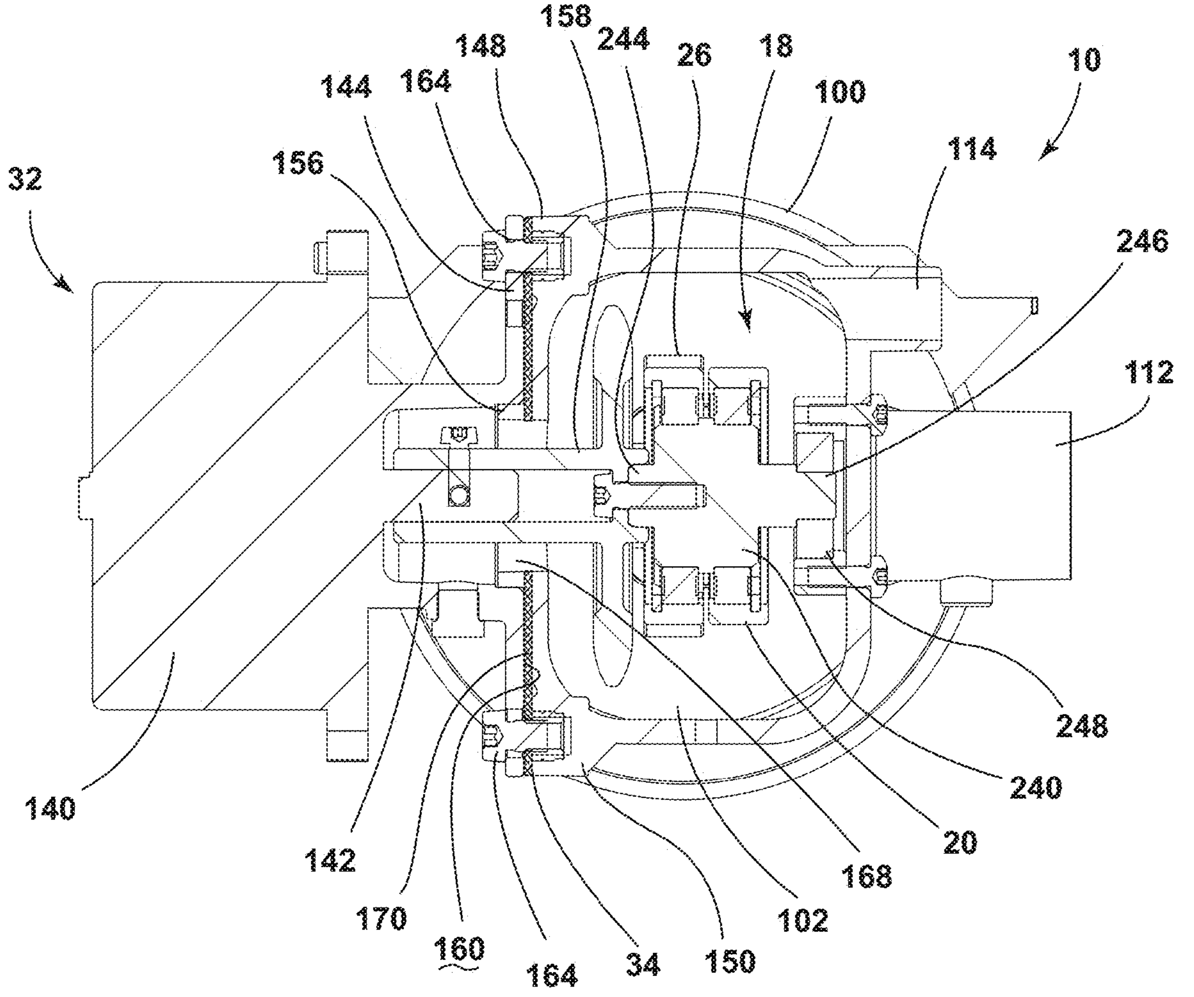
FIG. 5 is a cross-sectional view of the air pulse generator and the motor assembly of FIG. 3, taken along lines V-V, according to the present disclosure.
Figure 6:
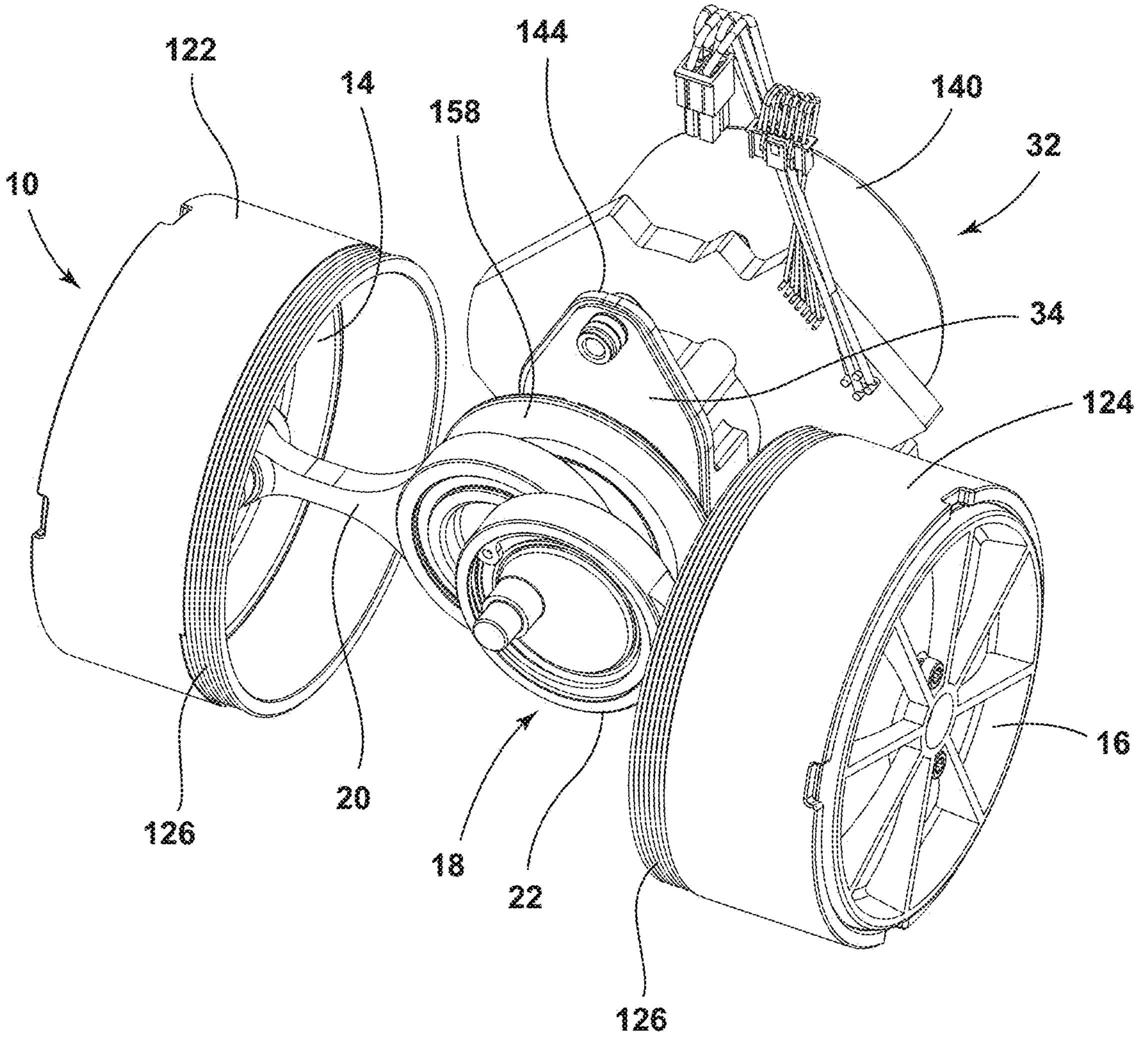
FIG. 6 is a partial side perspective view of an air pulse generator having a connector assembly engaging a motor assembly, according to the present disclosure.

Referring still to FIG. 3, as well as FIGS. 4-6, the air pulse generator 10 includes guide supports 122, 124 coupled to each outer end 104, 106, respectively. The guide supports 122, 124 are generally cylindrical. The first and second pistons 14, 16 are disposed within the guide supports 122, 124, respectively, and enclose the interior chamber 102. In the illustrated configuration, the guide supports 122, 124 each have a connecting feature 126, such as threads, that engage mating connection features 128, such as mating threads, for coupling to the casing 100. An interior of each guide support 122, 124 is in fluid communication with the interior chamber 102, guiding movement of the first and second pistons 14, 16 to oscillate air and generate air pulse, as described herein.

The air pulse generator 10 is coupled to or includes the motor assembly 32, which drives the movement of various components in the air pulse generator 10 to generate the air pulses. The motor assembly 32 is coupled to the casing 100 on an opposing side of the casing 100 relative to the outlet projections 110, 112. The motor assembly 32 includes electrical connectors 130, which are configured to extend to and couple with the controller 80 (FIG. 2).

The air pulse generator 10 includes multiple moving components, including the motor assembly 32, the connector assembly 18, and the pistons 14, 16. The moving components engage other components of the air pulse generator 10. For example, the motor assembly 32 is coupled to the casing 100, and the connector assembly 18 is coupled to the pistons 14, 16, as described herein. The activation of the motor assembly 32 to drive the movement of various components can cause sound to be generated by the translation of vibration between components. This sound or noise may be generated from components moving against one another, the materials of various components, and/or the movement of components due to gap clearance (e.g., rattling). The air pulse generator 10 includes the dampener 34 between the motor assembly 32 and the casing 100 and the dampening pads 24, 30 between the connector assembly 18 and the pistons 14, 16 to reduce vibration translation between the respective components. Further, the air pulse generator 10 includes a configuration of the hinge assemblies 22, 28 of the connector assembly 18 that reduces rattling sounds caused by gap clearances.

Referring still to FIGS. 3-6, the motor assembly 32 includes a motor 140, a drive shaft 142 operably coupled to the motor 140, and a bracket 144 for coupling the motor 140 to the casing 100. The drive shaft 142 extends within an inner channel 146 of the bracket 144, such that the drive shaft 142 generally does not extend into the casing 100. As the casing 100 is constructed of plastic materials, the engagement between the bracket 144 and the casing 100 may result in the generation of noise from the translation of vibration from the motor 140 to the bracket 144 and, ultimately, to the casing 100, where the sound can be amplified. Without the dampener 34, the vibration can lead to a high-frequency sound when the motor 140 operates at higher speeds, which could peak at about 1 kHz. Accordingly, the dampener 34 is disposed between the bracket 144 and the casing 100 to reduce, minimize, or prevent the translation of vibration caused by the activation of the motor 140.

The casing 100 generally includes two flanges 148, 150 that extend in opposing directions from the center portion 108 of the casing 100. In the illustrated example, the flanges 148, 150 are configured as upper and lower flanges 148, 150. The flanges 148, 150 provide attachment locations between the casing 100 and the motor assembly 32.

The casing 100 defines an opening 156 in the center portion 108 between the flanges 148, 150. A flywheel 158 extends from the interior chamber 102, through the opening 156, and into the inner channel 146 of the bracket 144 to engage the drive shaft 142. The flywheel 158 also extends through the dampener 34. The flywheel 158 is configured to operably couple the motor assembly 32 with the connector assembly 18. The flywheel 158 may be advantageous for conserving mechanical energy by making the rotation of the motor assembly 32 smoother. The engagement of the flywheel 158 to the motor assembly 32 reduces vibration that is transferred by the flywheel 158 to the connector assembly 18 from the motor 140.

The dampener 34 corresponds to the size and shape of an engagement surface 160 of the bracket 144 to generally cover a substantial portion or an entirety of the engagement surface 160. For example, in the illustrated configuration, the engagement surface 160 of the bracket 144 is an elongated polygonal or oval shape with apertures 162 for receiving the fasteners 164 and a central opening into the inner channel 146. Similarly, the dampener 34 is an elongated polygonal or oval shape with apertures 166 for the fasteners 164 and a central opening 168, where the apertures 166 and the central opening 168 of the dampener 34 align with the apertures 162 and the inner channel 146 of the bracket 144, respectively. In this way, the dampener 34 does not impinge the engagement between or function of the flywheel 158 and the drive shaft 142. The dampener 34 is configured to abut the flanges 148, 150 and a surface of the casing 100 around the opening 156 and the engagement surface 160 of the bracket 144. Generally, the dampener 34 completely covers the engagement surface 160 of the bracket 144.

One or both sides of the dampener 34 may include an adhesive 170 for assisting in coupling the dampener 34 to the casing 100 and/or the bracket 144. The adhesive 170 may assist with properly aligning the dampener 34, particularly with the engagement surface 160 of the bracket 144. Additionally, the dampener 34 is coupled to the bracket 144 and the casing 100 via the fasteners 164. The dampener 34 is generally constructed of a rubber material with a low compression set percent. The material of the dampener 34 assists with reducing noise caused by movement or vibration of components by reducing vibration translation from the motor assembly 32 to the casing 100. Additionally, the plastic casing 100 of the air pulse generator 10 may amplify sound, and the dampener 34 reduces the sound translation to the casing 100 that could be amplified.

With the low compression set percent, the material of the dampener 34 also maintains the relationship between the motor assembly 32 and the casing 100. When initially assembled, the bracket 144 is spaced at a predefined distance from the casing 100, which corresponds with a thickness of the dampener 34. The fasteners 164 couple the bracket 144, the dampener 34, and the casing 100 in this initial arrangement. The rigidity and compression set percent of the material of the dampener 34 minimize or prevent the dampener 34 from becoming substantially thinner over time. Significant change in the thickness of the dampener 34, loosens the relationship between the bracket 144, the dampener 34, and the casing 100 based on the arrangement with the fasteners 164. If the dampener 34 becomes too thin, the bracket 144 would again vibrate or move against the casing 100, causing noise. Accordingly, the dampener 34 is configured to maintain its thickness over time to maintain the relationship between the casing 100 and the bracket 144.

Figure 7:
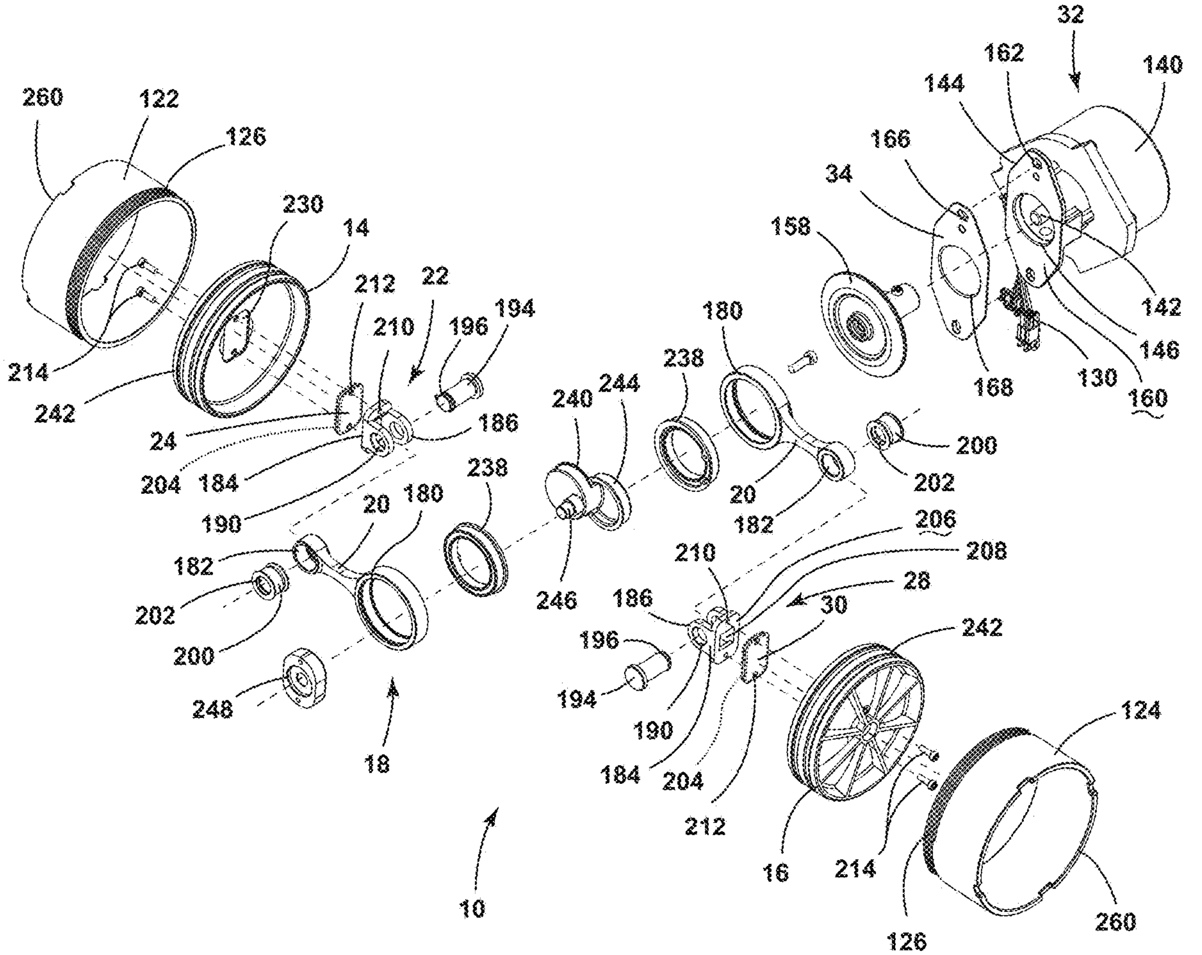
FIG. 7 is a side perspective exploded view of an air pulse generator and a motor assembly for an air control assembly, according to the present disclosure.
Figure 8:
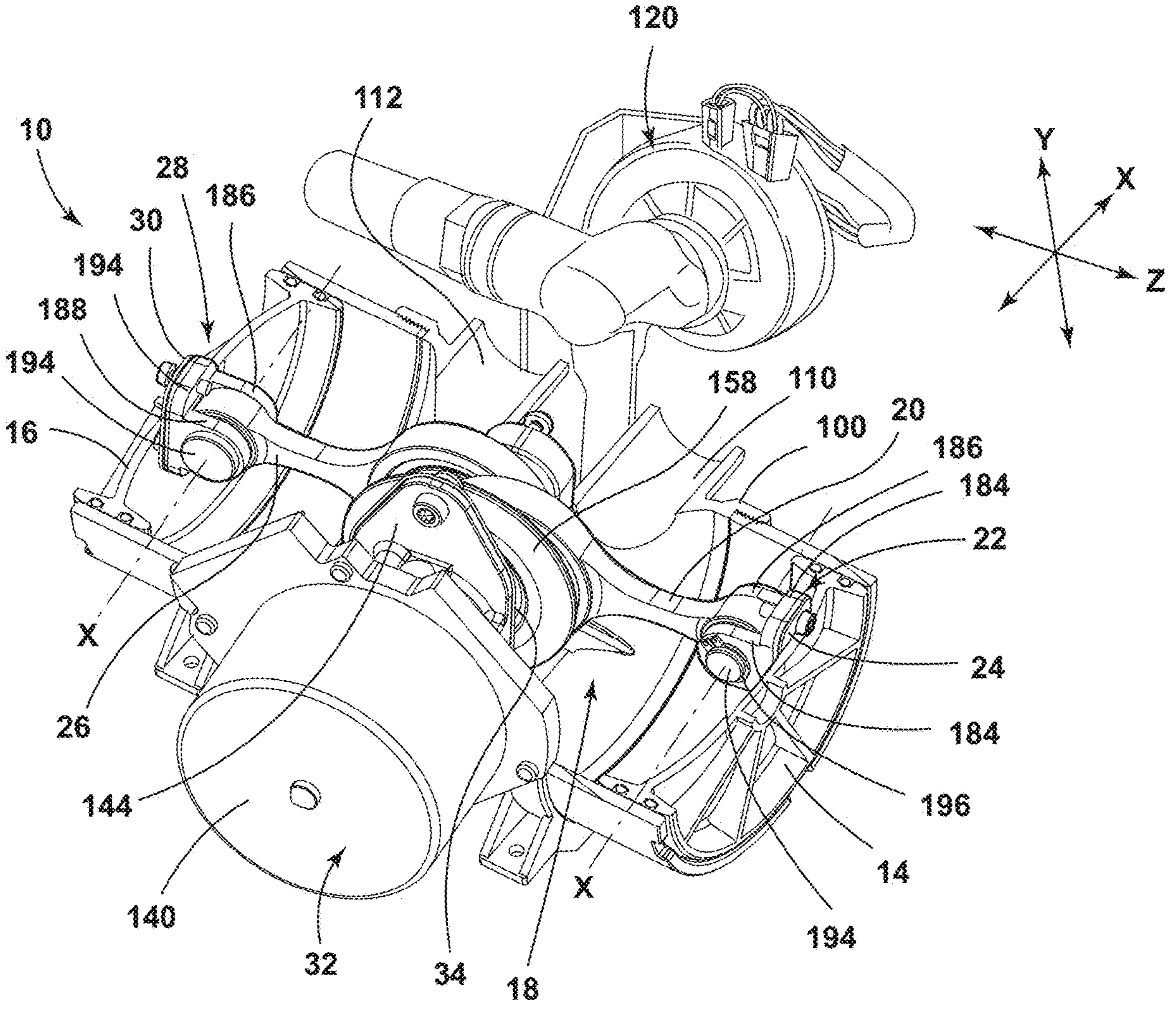
FIG. 8 is a rear perspective view of an air pulse generator with a portion of a casing removed and a blower coupled to the air pulse generator, according to the present disclosure.

Referring still to FIG. 6, as well as FIGS. 7 and 8, the motor assembly 32 is disposed generally outside the casing 100 and is operably coupled to components within the casing 100 of the air pulse generator 10. The flywheel 158 is disposed partially within the casing 100 and extends into the motor assembly 32 to engage the drive shaft 142. The flywheel 158 is configured to translate the motion of the drive shaft 142 into the air pulse generator 10.

The air pulse generator 10 includes the connector assembly 18, which is operably coupled to the motor assembly 32 via the flywheel 158. The connector assembly 18 includes the first and second connecting rods 20, 26 operably coupled to the first and second pistons 14, 16, respectively. The first and second connecting rods 20, 26 are configured to translate the rotational motion of the motor 140 from the flywheel 158 into linear movement of the first and second pistons 14, 16 within the guide supports 122, 124.

The connector assembly 18 extends from the first piston 14 to the second piston 16. Movement of the first connecting rod 20 relative to the second connecting rod 26 causes the movement of the pistons 14, 16. Each connecting rod 20, 26 defines an inner opening 180 and an outer opening 182. The inner openings 180 are larger than the outer openings 182. The inner openings 180 of the connecting rods 20, 26 are disposed proximate to one another, while the outer openings 182 are disposed proximate to the pistons 14, 16, respectively.

Figure 9:
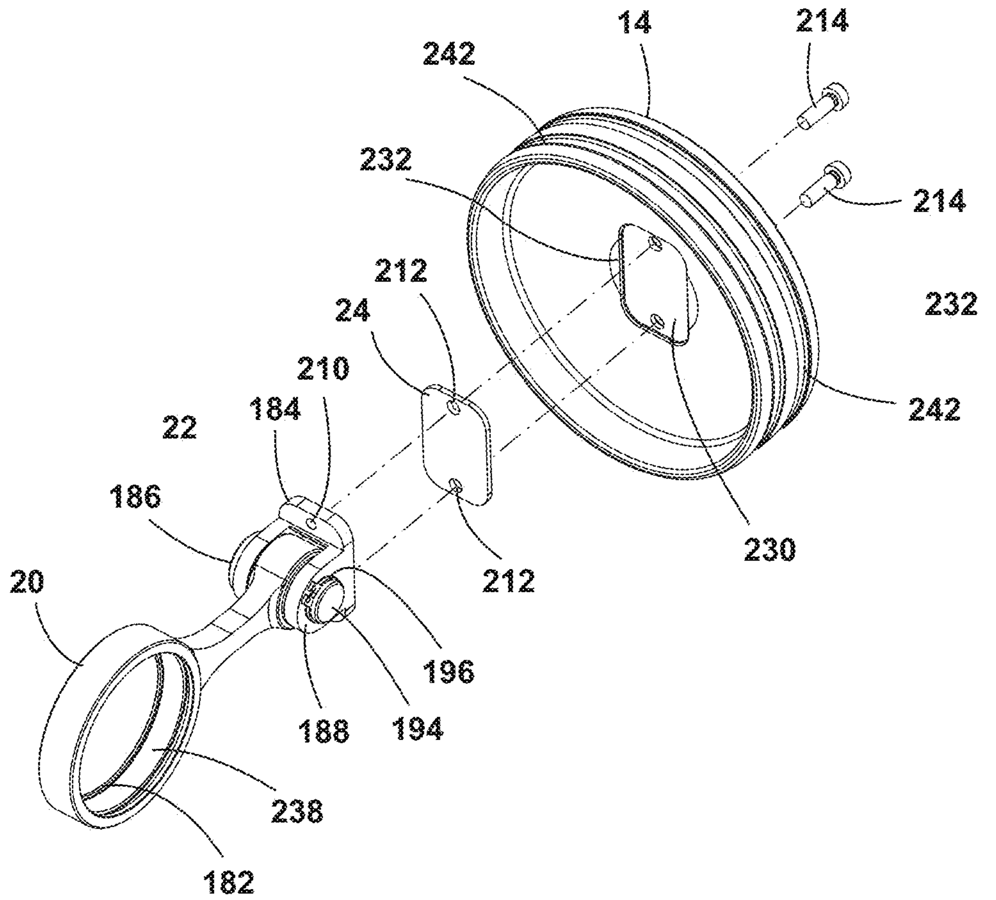
FIG. 9 is a side perspective exploded view of a connecting rod configured to engage a piston via a hinge assembly and a dampening pad, according to the present disclosure.
Figure 10:
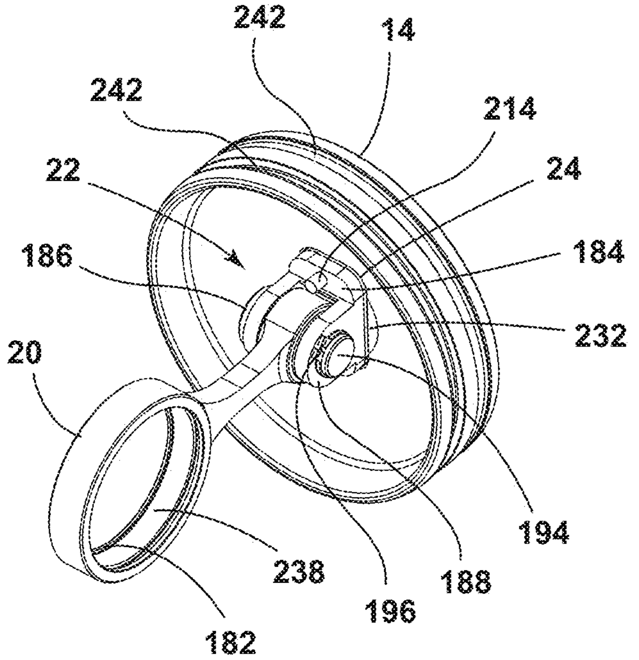
FIG. 10 is a side perspective view of a connecting rod coupled to a piston for an air pulse generator, according to the present disclosure.

Referring still to FIGS. 7 and 8, as well as FIGS. 9 and 10, the connecting rods 20, 26 are coupled to the pistons 14, 16 via the hinge assemblies 22, 28, respectively. Each hinge assembly 22, 28 includes a hinge base 184 with coupling extensions 186, 188 extending from the hinge base 184. The coupling extensions 186, 188 are spaced from one another and each defines an aperture 190 for receiving a pin 194. The apertures 190 align with the outer openings 182 of the respective connecting rod 20, 26, and the pins 194 extend through the coupling extensions 186, 188 and the outer openings 182 to couple the connecting rods 20, 26 to the hinge bases 184. The hinge assemblies 22, 28 also include stoppers 196 disposed proximate to each coupling extension 186, 188 to retain the pins 194 in position. Bearings 200 are disposed within the outer openings 182 of the connecting rods 20, 26, and the pins 194 extend through the bearings 200 to couple the connecting rods 20, 26 to the hinge assemblies 22, 28.

The arrangement of the hinge assemblies 22, 28 allows the connecting rods 20, 26 to rotate, as well as translate linearly in response to the activation of the motor 140. Generally, the connecting rods 20, 26 move horizontally and vertically. In the illustrated example of FIG. 8, the connecting rods 20, 26 are configured to move linearly in a z-direction and vertically in a y-direction by rotating about an x-axis. However, the relationship between the bearings 200 and the pins 194 in the hinge assemblies 22, 28 can result in an additional twisting motion of the connecting rods 20, 26.

The pins 194 extend through a through-hole 202 in the bearings 200, which have gap clearances due to manufacturing processes. Generally, it is inefficient during the manufacturing process to reduce gap clearances to zero, however, the gap clearances can result in rattling or knocking sounds. The gap clearance or additional space in the through-hole 202 can allow the pins 194 to twist and rotate within the through-hole 202, which can cause vibration and rattling sounds. If the plastic pistons 14, 16 are in direct contact with the hinge assemblies 22, 28, any rattling may be amplified by the plastic pistons 14, 16. Additionally, the pistons 14, 16 have a thickness less than a thickness of the casing 100, which can cause the pistons 14, 16 to resonate when vibrations are transferred to the pistons 14, 16. Accordingly, the dampening pads 24, 30 are disposed between the hinge assemblies 22, 28 and the pistons 14, 16 to prevent translation of vibration to the pistons 14, 16, as described herein.

Additionally, the length of the pin 194 can affect the amount of twisting that occurs within the through-hole 202. The pins 194 in the air pulse generator 10 have an increased length compared to conventional configurations to reduce the tilting or wobbling effect and, consequently, reduce the noise generated by the air pulse generator 10. For example, the through-holes 202 in the bearings 200 may have a diameter of about 60 mm, and the pins 194 may have a diameter of about 50 mm, leaving about 10 mm of additional space within the through-holes 202. With a shorter length, the conventional hinge pins can move up to 6° relative to a central axis of the through-hole 202, which generally aligns with the rotational x-axis illustrated in FIG. 8. In comparison, in the disclosed air pulse generator 10, the pins 194 are elongated, reducing the twisting motion to less than 5° of rotation or movement, such as, for example, to about 4° of rotation relative to the rotation x-axis, and, consequently, reducing the rattling noise caused by the hinge assemblies 22, 28.

Referring still to FIGS. 7-10, the air pulse generator 10 disclosed herein includes the dampening pads 24, 30 disposed between the hinge bases 184 and the pistons 14, 16 on each side of the air pulse generator 10. The dampening pads 24, 30 may include an adhesive 204 on one or both sides to be coupled to the hinge assemblies 22, 28 and the pistons 14, 16. The adhesive 204 may assist in properly aligning the dampening pads 24, 30 with one or both of the hinge assemblies 22, 28, and the pistons 14, 16. The dampening pads 24, 30 have a shape and size that correspond with a perimeter size and shape of abutting surfaces 206 of the hinge bases 184. In the illustrated configuration, the hinge bases 184 define a central opening 208, while the dampening pads 24, 30 do not. The perimeter size and shape of the hinge bases 184 define a substantially rectangular shape with rounded corners. The dampening pads 24, 30 also have rectangular shapes with rounded corners, corresponding to the perimeter of the hinge bases 184. Further, both the hinge bases 184 and the dampening pads 24, 30 define apertures 210, 212, respectively, that align with one another to receive fasteners 214. Accordingly, the dampening pads 24, 30 generally cover a substantial portion or the entire abutting surface 206 of the respective hinge base 184.

Referring still to FIGS. 9 and 10, the first piston 14, the first connecting rod 20, the first hinge assembly 22, and the first dampening pad 24 is illustrated. It is understood that the second piston 16, the second connecting rod 26, the second hinge assembly 28, and the second dampening pad 30 are constructed, arranged, and function, in the same manner, as described herein. The first hinge assembly 22 is coupled to the first piston 14. The fasteners 214 extend through the hinge base 184 and the piston 16, securing the hinge assembly 22 with the first connecting rod 20 to the first piston 14 with the dampening pad 24 therebetween.

The dampening pad 24 is generally constructed of a rubber material with a low compression set percent. The material of the dampening pad 24 assists with reducing noise caused by movement or vibration of the hinge assembly 22 and the piston 14 by reducing or preventing translation of vibrations. The material of the dampening pad 24 also maintains the relationship between the first hinge assembly 22 and the first piston 14.

Similar to the bracket 144 of the motor assembly 32 and the casing 100 described herein, when initially assembled, the hinge base 184 is spaced a predefined distance from the first piston 14, which corresponds with a thickness of the dampening pad 24. The fasteners 214 couple the first piston 14, the dampening pad 24, and the hinge base 184 in this initial arrangement. The rigidity and compression set percent of the material of the dampening pad 24 minimize or prevent the dampening pad 24 from becoming significantly thinner over time. Any significant change in the thickness of the dampening pad 24, loosens the relationship between the first piston 14, the dampening pad 24, and the hinge base 184. If the dampening pad 24 becomes too thin, the hinge assembly 22 could again vibrate or move against the piston 14, causing noise. Accordingly, the dampening pad 24 is configured to maintain its thickness over time to maintain the relationship between the hinge assembly 22 and the first piston 14. The second dampening pad 30 has similar structure, properties, and function as described with respect to the first dampening pad 24.

Additionally, the piston 14 defines a recessed region 230 that has a size that generally corresponds with the size and shape of the dampening pad 24. For example, in the illustrated configuration, the dampening pad 24 is generally rectangular with rounded corners, and the recessed region 230 is rectangular with rounded corners. The piston 14 may also define an intermediate region 232, which is a recessed area that has a depth less than the depth of the recessed region 230. The intermediate region 232 may be defined on opposing sides of the recessed region 230 and may assist with placing and removing the dampening pad 24 in the recessed region 230. An edge between a surface of the piston 14 and the recessed region 230 may be radiused or beveled to increase the efficiency of the manufacturing process.

Referring still to FIGS. 9 and 10, the dampening pad 24 is disposed within the recessed region 230 of the first piston 14 and may be secured in the recessed region 230 by the adhesive 204. The hinge base 184 is aligned with and abuts the dampening pad 24. As the dampening pad 24 is sized and shaped to correspond with the size and shape of the hinge base 184, the dampening pad 24 may prevent direct contact between the hinge base 184 and the first piston 14. The dampening pad 24 has a thickness that is slightly greater than the depth of the recessed region 230, allowing the dampening pad 24 to extend past and be offset from the surface of the first piston 14. This relationship may be advantageous to prevent the contact between the hinge base 184 and the first piston 14. The hinge assembly 22 is coupled to the piston 14 via the fasteners 214, which extend through the recessed region 230 of the piston 14, through the dampening pad 24, and through the hinge base 184. The second piston 16 also defines the recessed region 230 and the intermediate regions 232 and engages the second dampening pad 30 and the second hinge assembly 28 as described with respect to the first piston 14, the first hinge assembly 22, and the first dampening pad 24.

Figure 11:
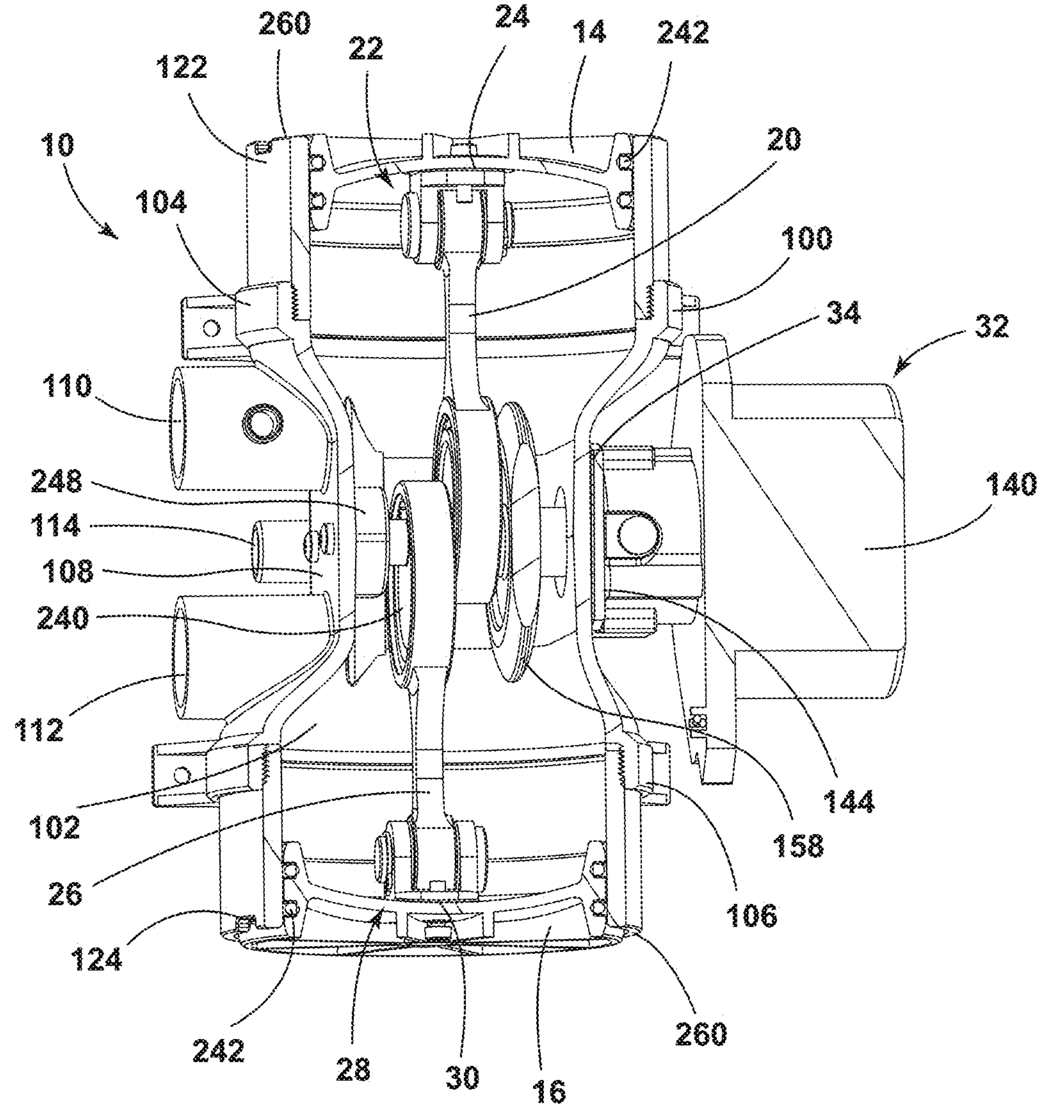
FIG. 11 is a top elevation cross-sectional view of the air pulse generator and the motor assembly of FIG. 3, taken along the lines XI-XI, according to the present disclosure.

Referring again to FIG. 7, and also to FIG. 11, the motor 140 is configured to drive movement of the connector assembly 18, which causes linear motion of the pistons 14, 16 to generate the air pulses. The dampener 34 and the dampening pads 24, 30 minimize or prevent contact between components, which may be advantageous for reducing or preventing noise caused by vibrating components. The dampener 34 and the dampening pads 24, 30 prevent contact with plastic components, such as the casing 100 and the pistons 14, 16, which can amplify sound when contacted. Further, the dampening pads 24, 30 may reduce or prevent translation of vibration caused by twisting within the hinge assemblies 22, 28.

The dampening pads 24, 30 and the dampener 34 are generally constructed of a rubber material, such as a silicone rubber. Additionally or alternatively, the dampening pads 24, 30 and the dampener 34 may be constructed of foam. Each of the dampening pads 24, 30 and the dampener 34 may have a thickness in a range from about 1 mm to about 4 mm. The dampening pads 24, 30 and the dampener 34 are clamped between respective components with high force, and the compression set percent may be low to retain thickness over time under this high clamping force. For example, the compression set percentage may be equal to or less than 35%. One non-limiting example of the material used for the dampening pads 24, 30 and the dampener 34 is the Bisco® HT-6240 transparent solid silicone.

The dampener 34, the dampening pads 24, 30, and the configuration of the hinge assemblies 22, 28 with the elongated pins 194 reduce the vibrations and sound transmission caused by the vibrations. Each of the dampener 34, the dampening pads 24, 30, and the hinge assemblies 22, 28 improve the acoustics and vibrations of the air pulse generator 10, which reduces sound transmission when the motor 140 is activated. Reducing the sound transmission assists in improving the experience of the patient while using the air control assembly 50 for therapy.

Referring still to FIG. 11, a bearing 238 is disposed within each inner opening 180 of the first and second connecting rods 20, 26. The bearings 238 are configured to engage a turn shaft 240, which is disposed within each inner opening 180 to couple the first connecting rod 20 to the second connecting rod 26. The bearings 238 allow the turn shaft 240 to rotate, which causes movement of the connecting rods 20, 26. The flywheel 158 is configured to transfer the rotational motion of the drive shaft 142 to the turn shaft 240. The rotation of the turn shaft 240 driven by the flywheel 158 causes the first and second connecting rods 20, 26 to move in circular or elliptical paths, moving linearly and vertically. The movement of the connecting rods 20, 26 may be a reciprocating motion, elliptical motion, and/or circular motion.

The shape of the turn shaft 240 helps define the movement path of the connecting rods 20, 26. In the illustrated configuration, the turn shaft 240 is elongated, formed as two adjacent and overlapping circular portions. The elongated configuration of the turn shaft 240 assists in moving the connecting rods 20, 26 towards one another, as well as vertically.

The connecting rods 20, 26 are configured to translate the rotational motion of the motor 140 into linear movement of the pistons 14, 16. The linear movement of the pistons 14, 16 draws the pistons 14, 16 into the interior chamber 102, closer to one another, and then away from one another to generate the air pulses. The pistons 14, 16 each include seals 242, configured as O-rings 242, between the pistons 14, 16 and the guide supports 122, 124. The seals 242 prevent air from leaking out of the interior chamber 102, thereby creating more effective air pulses, while providing pumping air in the linear motion. The O-rings 242 may be a flexible material such as rubber, silicone, or nitrile.

Referring to FIGS. 12-15, the motor assembly 32 is disposed outside the casing 100 and is operably coupled with the connector assembly 18 within the casing 100 via the flywheel 158. The motor 140 is configured to drive movement of the connector assembly 18 and, consequently, the pistons 14, 16. The rotation of the drive shaft 142 from the motor 140 is transferred to the flywheel 158, which transfers the rotation to the turn shaft 240. The turn shaft 240 has opposing projections 244, 246 with one projection 244 extending from the first connecting rod 20 to engage the flywheel 158 and the second projection 246 extending from the second connecting rod 26 to engage a support plate 248. The support plate 248 is on the opposing side of the connector assembly 18 compared to the flywheel 158 and is stationary, providing stability and support for the movement of the turn shaft 240.

The turn shaft 240 is configured to rotate within the bearings 238 in the first and second connecting rods 20, 26, causing the first and second connecting rods 20, 26 to move in the elliptical paths. The elliptical path of the first connecting rod 20 is generally opposite of the elliptical path of the second connecting rod 26 (i.e., the first connecting rod 20 rotates up while the second connecting rod 26 rotates down).

Figure 12:
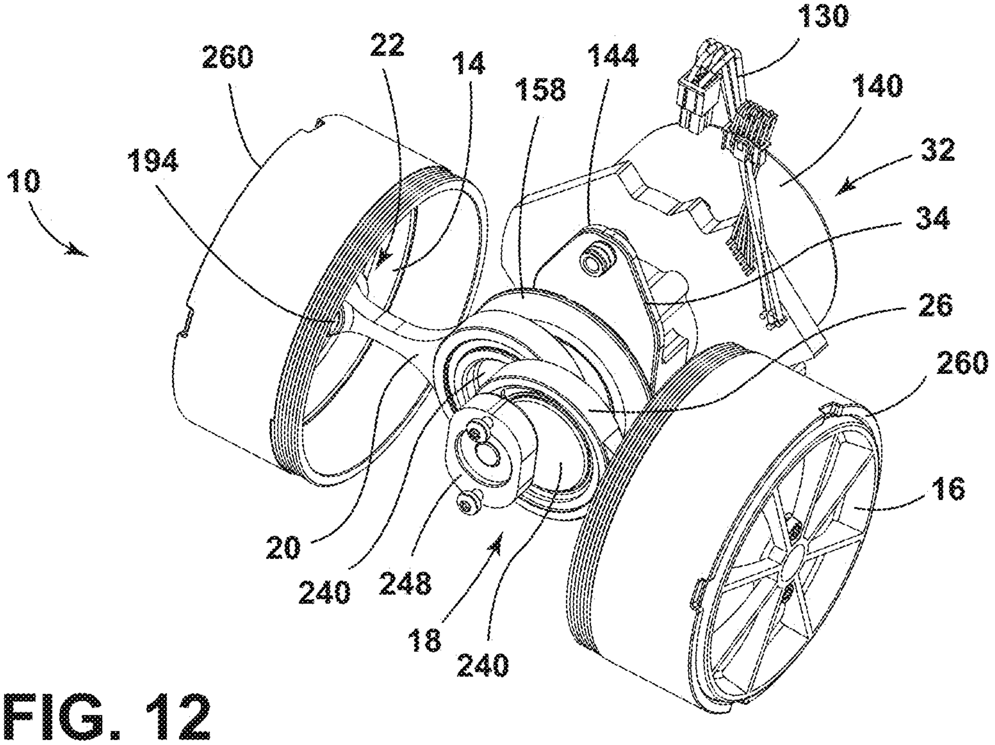
FIG. 12 is a side perspective view of an air pulse generator with a casing removed, where pistons are in an expanded position, according to the present disclosure.

For example, as illustrated in FIG. 12, when the pistons 14, 16 are disposed in an expanded position proximate outer edges 260 of the guide supports 122, 124, the connecting rods 20, 26 extend generally horizontal. The vertical adjustment via rotation about the x-axis is minimal, and the inner openings 180 slightly overlap. As the motor 140 rotates the turn shaft 240, the connecting rods 20, 26 begin to move vertically and toward one another, as illustrated in FIG. 13.

Figure 13:
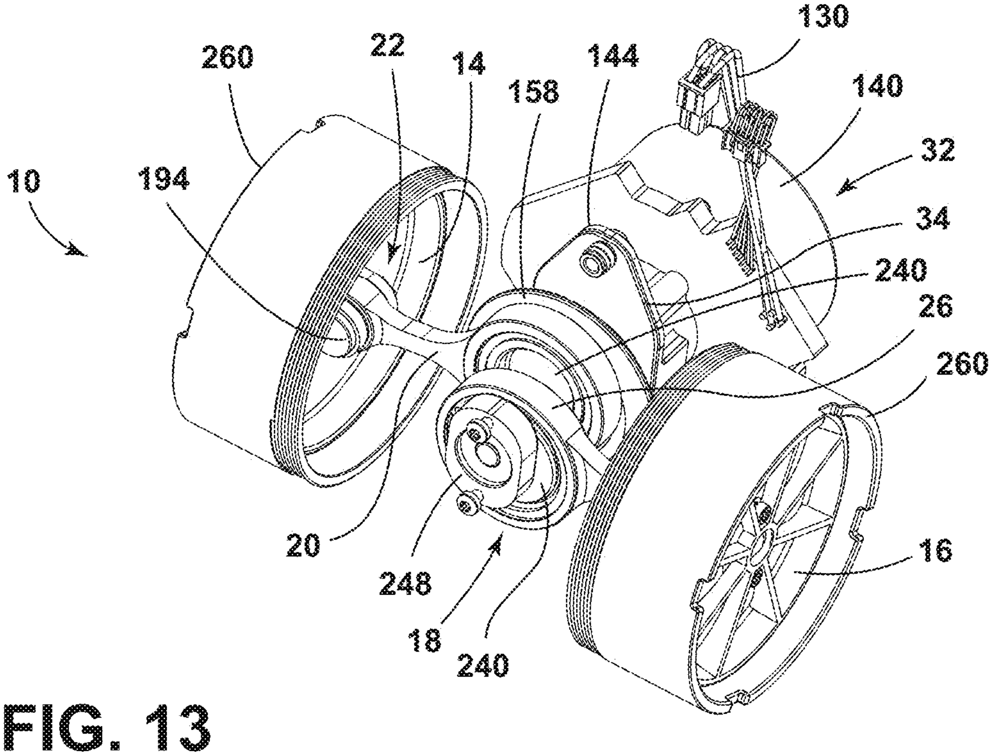
FIG. 13 is a side perspective view of an air pulse generator with a casing removed, where pistons are in an intermediate position and connecting rods are in first angled positions, according to the present disclosure.

In FIG. 13, the pistons 14, 16 are disposed in an intermediate position. The first connecting rod 20 is rotated in about the x-axis in a first direction, generally upwards, while the second connecting rod 26 rotates about the x-axis in a second direction, generally downwards. The inner openings 180 are generally vertically aligned with one another.

Figure 14:
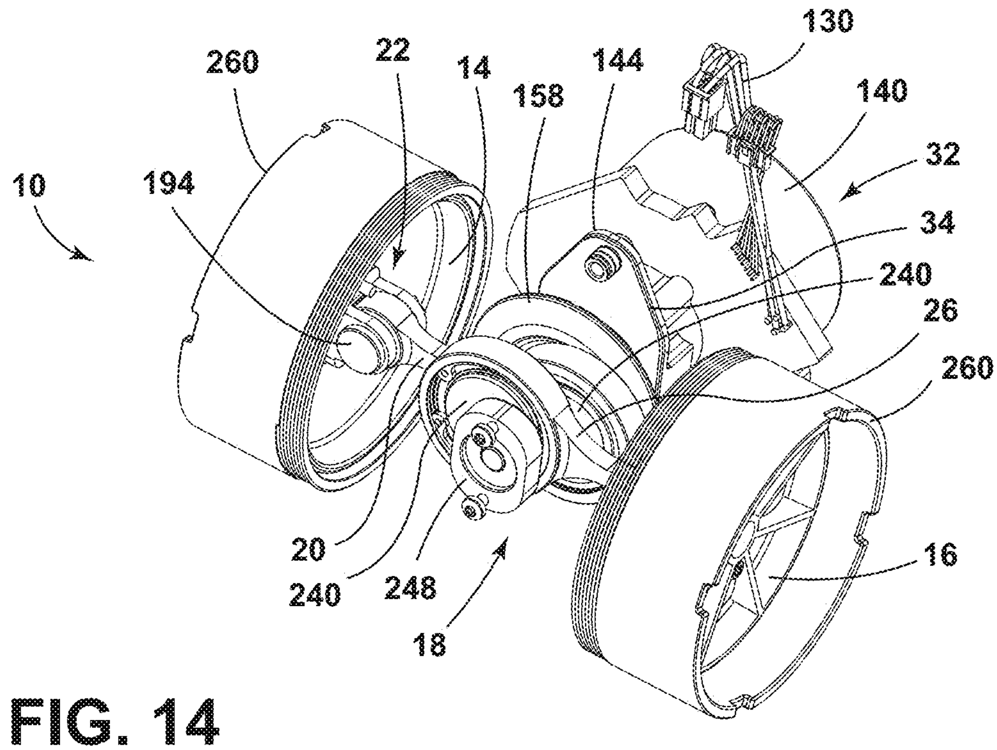
FIG. 14 is a side perspective view of an air pulse generator with a casing removed, where pistons are in a retracted position, according to the present disclosure.

As illustrated in FIG. 14, as the turn shaft 240 continues to rotate, the pistons 14, 16 are drawn to a retracted position by the connector assembly 18, where the pistons 14, 16 are closest to one another in the interior chamber 102. The connecting rods 20, 26 are generally horizontal and the first and second connecting rods 20, 26 significantly overlap. The inner opening 180 of the first connecting rod 20 is disposed adjacent to the outer opening 182 of the second connecting rod 26, and the inner opening 180 of the second connecting rod 26 is disposed adjacent to the outer opening 182 of the first connecting rod 20.

Figure 15:
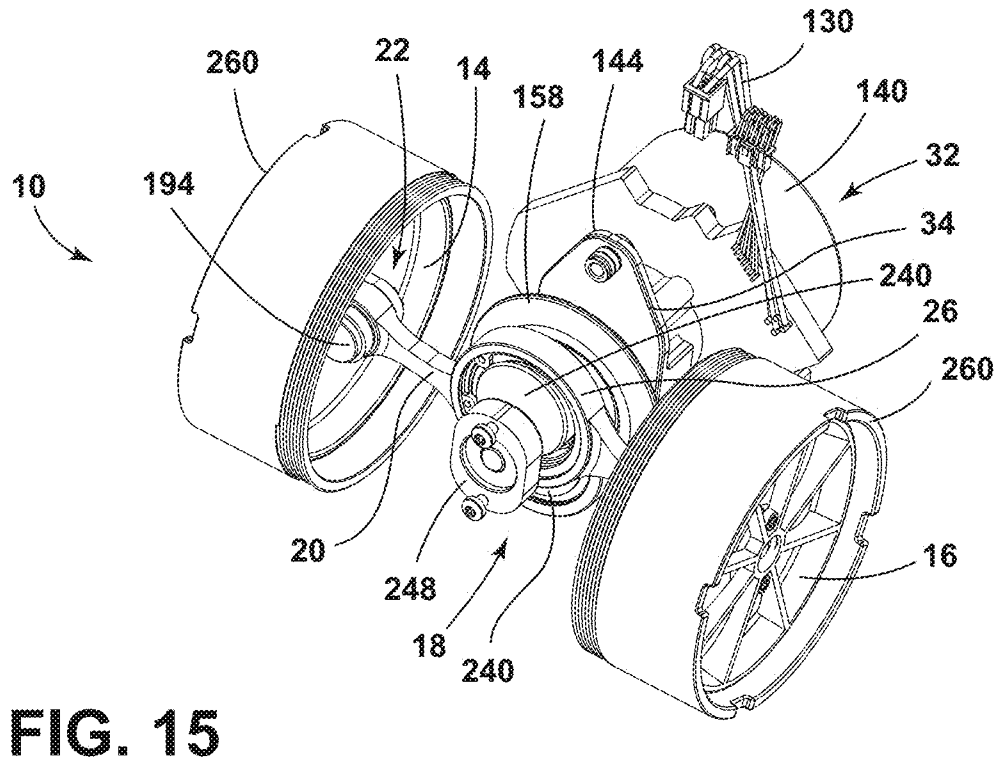
FIG. 15 is a side perspective view of an air pulse generator with a casing removed, where pistons are in an intermediate position and connecting rods are in second angled positions, according to the present disclosure.

Upon further rotation of the turn shaft 240, as illustrated in FIG. 15, the connecting rods 20, 26 move away from one another. The pistons 14, 16 return to the intermediate position, while the first and second connecting rods 20, 26 are in a position that is a mirror image of that illustrated in FIG. 13. The first connecting rod 20 is rotated in about the x-axis in the second direction, generally downwards, while the second connecting rod 26 rotates about the x-axis in the first direction, generally upwards. The inner openings 180 are generally vertically aligned with one another.

Referring still to FIGS. 12-15, the elliptical paths of the first and second connecting rods 20, 26 can cause vibration of the hinge assemblies 22, 28. The vibration is absorbed and/or not translated by the dampening pads 24, 30 to reduce sound caused by the movement of the connector assembly 18 and the pistons 14, 16. The motor 140 drives the movement of the connector assembly 18, and any noise caused by vibration of the motor assembly 32 is reduced or prevented by the dampener 34. The elliptical path of the connecting rods 20, 26 translates the rotational motion of the motor 140 to the linear motion of the pistons 14, 16. The linear motion of the pistons 14, 16 oscillates the air within the interior chamber 102 to generate air pulses for the patient therapy.

Figure 16:
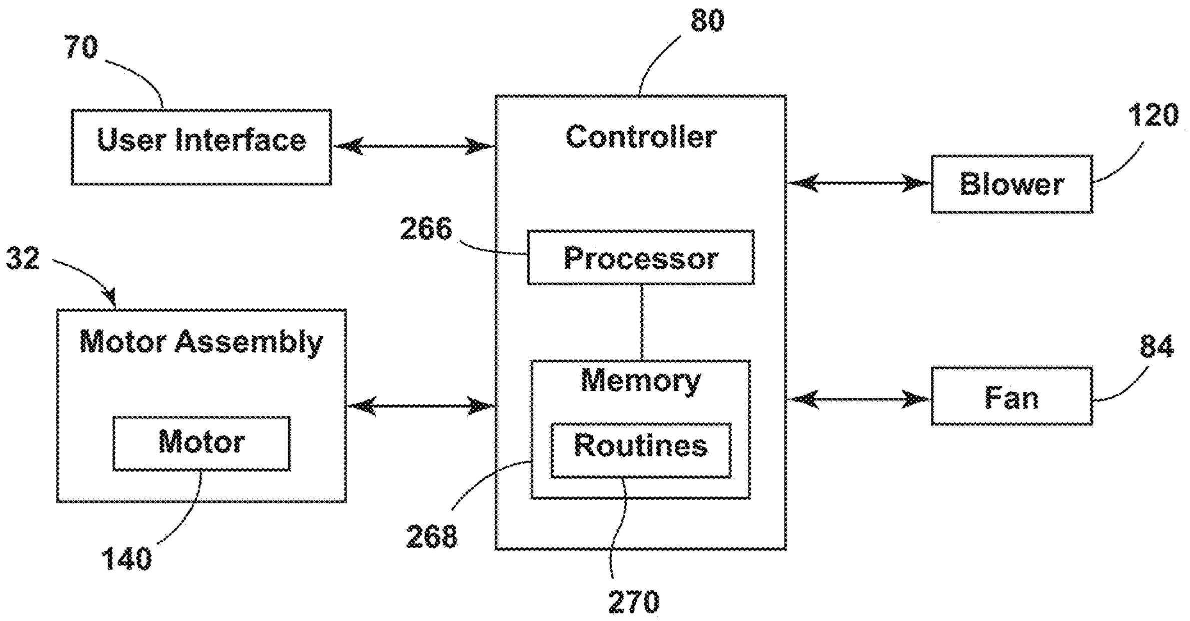
FIG. 16 is a block diagram for a controller of an air control assembly, according to the present disclosure.

Referring to FIG. 16, the controller 80 includes a processor 266, a memory 268, and other control circuitry. Instructions or routines 270 are stored within the memory 268 and executable by the processor 266. For example, the predefined therapy programs may be stored within the memory 268. The controller 80 may also include communication circuitry configured for bidirectional wired or wireless communication, which may be advantageous for reporting therapy or patient information to remote devices and systems, such as electronic medical records.

The controller 80 may include various types of control circuitry, digital or analog, and may include the processor 266, a microcontroller, an application-specific circuit (ASIC), or other circuitry configured to perform the various input and output, control, analysis, or other functions described herein. The memory 268 may be implemented in a variety of volatile and nonvolatile memory formats. The routines 270 include operating instructions to enable various methods and functions described herein.

Figure 17:
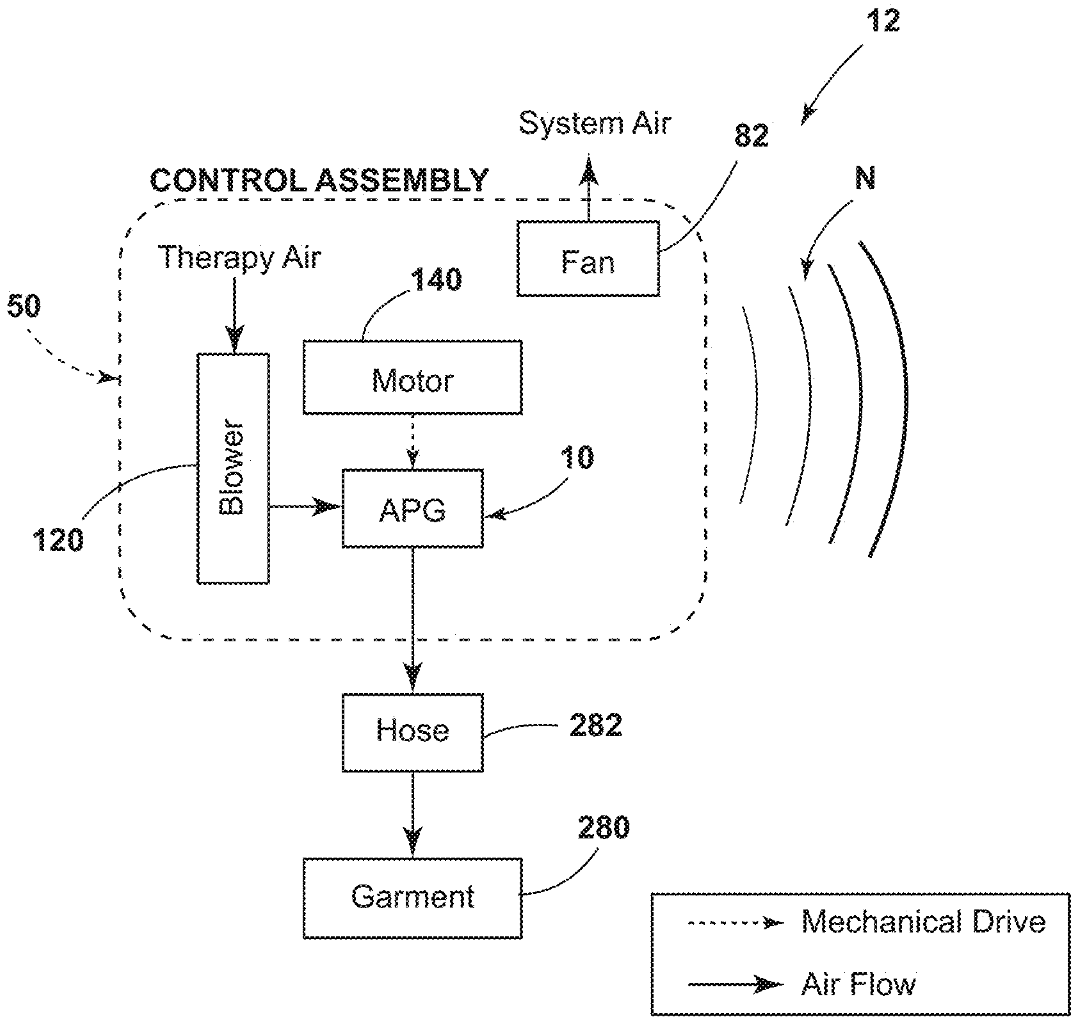
FIG. 17 is a block diagram of mechanical drive and airflow in an airway clearance therapy system, according to the present disclosure.

Referring still to FIG. 16, as well as FIG. 17, the controller 80 is communicatively coupled with the motor assembly 32 and the blower 120. The blower 120 is operably coupled to the air pulse generator 10 and in fluid communication with a garment 280. The blower 120 provides the initial pressure to inflate the garment 280. The intensity of the therapy is a result of controlling the speed of the blower 120. Generally, the blower 120 has ten speed settings available, which results in ten intensity levels for the patient. The blower 120 directs air into the interior chamber 102 while the motor 140 drives the motion of the pistons 14, 16 via the connector assembly 18 to drive the chamber compression speed.

Figure 18:
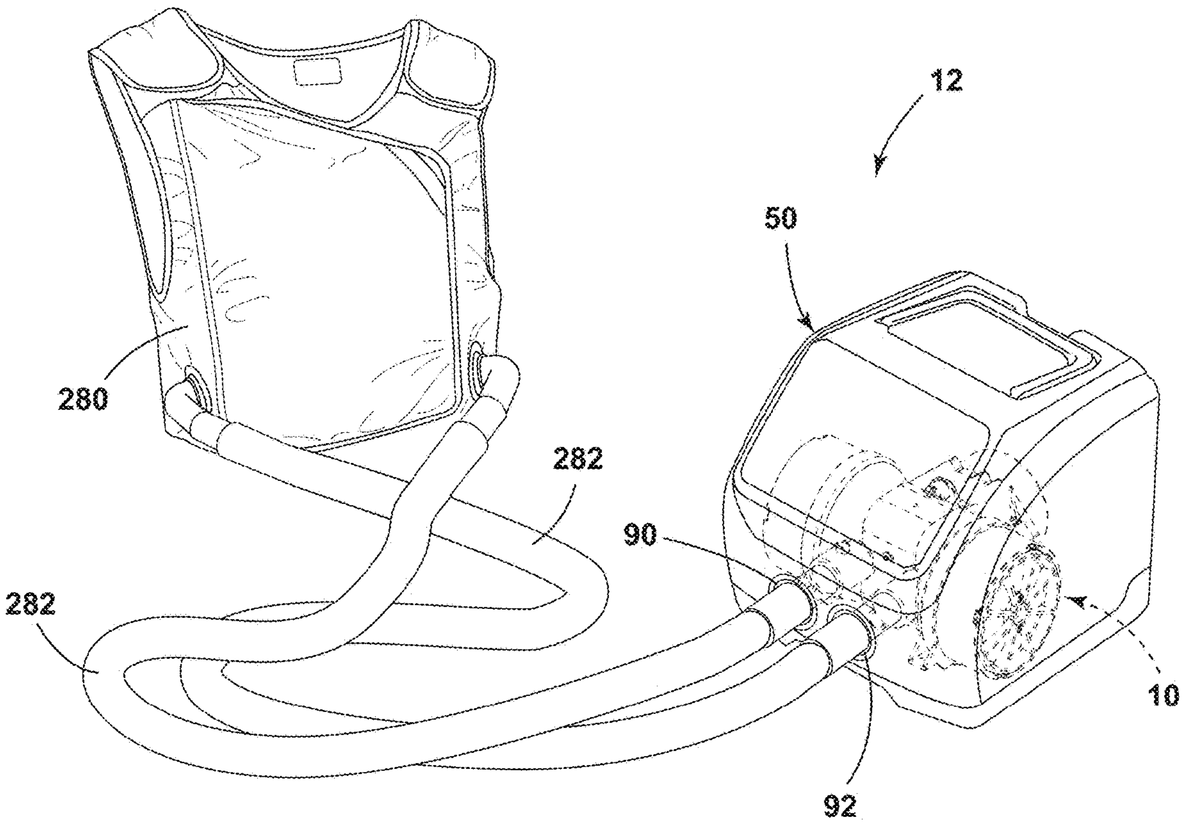
FIG. 18 is a side perspective view of an airway clearance therapy system, according to the present disclosure.

Referring still to FIG. 17, as well as FIG. 18, the air pulse frequency is generated by the motor 140, which is generally a direct current (DC) brushless motor 140. The minimum air pulse frequency is about 5 Hz and the maximum air pulse frequency is about 20 Hz. The motor 140 is configured to rotate between about 300 revolutions per minute (RPM) and about 1200 RPM.

The oscillating air pressure or air pulses are created by the pulsing action of the first and second pistons 14, 16, which oscillate the air within the interior chamber 102 at a selected frequency. The oscillation frequency of the pistons 14, 16 may be up to twenty cycles per second, where a single cycle results in the pistons 14, 16 moving from the expanded position, to the retracted position, and back to the expanded position. The oscillatory pressure created by the first and second pistons 14, 16 generally follows a sinusoidal waveform pattern. The air within the air pulse generator 10 is directed to the garment 280 worn by the patient to provide the airway clearance or HFCWO therapy.

The air control assembly 50 includes the blower 120 in fluid communication with interior chamber 102 of the air pulse generator 10 and the motor assembly 32 operably coupled to interior components of the air pulse generator 10. The operation of the motor 140 and the interior components of the air pulse generator 10 often generate noise, represented by lines N, that can be heard outside of the housing 52. The inclusion of the dampening pads 24, 30 and the dampener 34 reduces or eliminates the noise generated by the movement of the components within the air control assembly 50.

The therapy system 12 includes the air control assembly 50 in fluid communication with the garment 280. In the illustrated configuration, the garment 280 is a vest, but the garment 280 may be any practicable garment 280 to be worn by the patient. The garment 280 is an inflatable garment 280 where an inner cavity of the garment 280 is in fluid communication with the air pulse generator 10 through hoses or tubing 282. The tubing 282 is coupled to the garment 280 and inserted into the outlet ports 90, 92 of the housing 52 to be in fluid communication with the air pulse generator 10 via the outlet projections 110, 112. The blower 120 is configured to direct air into the air pulse generator 10, which is then oscillated to create air pulses caused by the movement of the pistons 14, 16.

The air pulse generator 10 generates high-frequency pulsation from the air control assembly 50 to the garment 280. The air pulses operate to hyper-inflate the garment 280 worn by the patient. The air pulse generator 10 rapidly inflates (to hyper-inflate) and deflates the garment 280. The pistons 14, 16 moving toward one another causes the hyperinflation of the garment 280 to compress the chest of the patient, while the pistons 14, 16 moving away from one another reduces pressure in the garment 280 to relax the chest of the patient. Generally, the air pressure generated by the blower 120 is greater than atmospheric pressure so that oscillatory cycles of the pistons 14, 16 more effectively compress the chest of the patient. The airway clearance system 12 oscillates (i.e., compresses and relaxes) the chest of the patient to mobilize retained secretions to assist in avoiding respiratory infection, hospitalizations, and reduced lung function. The pulses from the garment 280 create pulses in the airways of the patient to dislodge mucus from the brachial wall and increase airflow in the airways to allow the mucus to move to larger airways and, ultimately, be removed from the body via coughing or other treatment devices.

Referring to FIGS. 1-18, the air pulse generator 10 includes the moving components to generate high-frequency pulses to treat patients, which can also vibrate and cause the generation of noise. The addition of the dampener 34 and the dampening pads 24, 30, along with the elongation of the pins 194 in the hinge assemblies 22, 28, maximizes the efficiency of the manufacturing process while reducing noise caused by the air pulse generator 10. This configuration of the air pulse generator 10 may reduce noise level to below a predefined level, which may be, for example, about 71 dBA.

Use of the present device may provide for a variety of advantages. For example, the air pulse generator 10 causes air pulses in the garment 280 for providing therapy to a patient. Additionally, dampening pads 24, 30 are disposed between the hinge assemblies 22, 28 for the connecting rods 20, 26 and the pistons 14, 16. These dampening pads 24, 30 reduce noise caused by the engagement between the hinge assemblies 22, 28 and the pistons 14, 16. Further, the dampening pads 24, 30 assist with the alignment of the components in the air pulse generator 10. Moreover, the pins 194 for the hinge assemblies 22, 28 are elongated compared to conventional configurations, which reduces the twisting motion of the pins 194 in the bearings 200 and, thereby, reduces noise caused by movement of the connecting rods 20, 26. Further, the dampener 34 is disposed between the motor assembly 32 and the enclosure, reducing noise caused by vibrations when the motor 140 is activated. Also, the dampening pads 24, 30 and the dampener 34 are constructed of a material, such as rubber, that has a low compression set percentage such that the components maintain thickness over time. The maintained thickness is advantageous for maintaining relationships between components and minimizing or preventing loosening engagements, which can increase noise caused by the movement of various components relative to one another. Additional benefits or advantages may be realized and/or achieved.

The device disclosed herein is further summarized in the following paragraphs and is further characterized by combinations of any and all of the various aspects described therein.

According to another aspect, an air pulse generator for a patient therapy system includes a casing and first and second pistons disposed within the casing. A connector assembly is coupled to each of the first and second pistons including a first connecting rod coupled to the first piston via a first hinge assembly and a first dampening pad disposed between the first piston and the first hinge assembly to reduce sound translation between the first hinge assembly and the first piston. The connector assembly also includes a second connecting rod coupled to the second piston via a second hinge assembly and a second dampening pad disposed between the second piston and the second hinge assembly to reduce sound translation between the second hinge assembly and the second piston. A motor assembly is operably coupled to the connector assembly. The motor assembly drives movement of the first and second connecting rods to, consequently, drive motion of the first and second pistons to oscillate air within the casing.

According to another aspect, first and second pistons are configured to move linearly between an expanded position and a retracted position.

According to another aspect, a motor assembly includes a bracket for coupling a motor assembly to a casing. A dampener is coupled between the bracket and the casing.

According to another aspect, a shape of a dampener corresponds with a shape of an engagement surface of a bracket.

According to another aspect, first and second pistons are constructed of plastic.

According to another aspect, first and second pistons each define a recessed region. First and second dampening pads are disposed within the recessed regions, respectively.

According to another aspect, a shape of dampening pads corresponds with a perimeter shape of a base of first and second hinge assemblies, respectively.

According to another aspect, first and second connecting rods are configured to move in elliptical paths in response to rotation from a motor assembly.

According to another aspect, first and second dampening pads are constructed of a rubber material.

According to another aspect, a turn shaft is disposed within an opening in first and second connecting rods. The turn shaft is operably coupled to a motor assembly via a flywheel.

According to another aspect, an air control assembly for an airway clearance system includes a casing and first and second pistons disposed within the casing. A connector assembly is coupled to each of the first and second pistons. A motor assembly is operably coupled to the connector assembly. The motor assembly includes a motor operably coupled to the connector assembly. The connector assembly is configured to translate rotational motion from the motor to linear motion of the first and second pistons between expanded and retracted positions to oscillate air within the casing. The motor assembly also includes a bracket coupled to the motor and a dampener disposed between the bracket and the casing to reduce translation of vibrations caused by the motor to reduce noise generation.

According to another aspect, a connector assembly includes a first connecting rod coupled to the first piston via a first hinge assembly and a second connecting rod coupled to the second piston via a second hinge assembly.

According to another aspect, dampening pads are disposed between a connector assembly and first and second pistons to reduce vibration translation between the connector assembly and the first and second pistons, respectively.

According to another aspect, first and second pistons define a recessed region. Dampening pads are disposed within the recessed regions, respectively.

According to another aspect, a motor is configured to rotate at a speed between 300 rpm and 1200 rpm.

According to another aspect, a dampener is constructed of at least one of rubber and foam.

According to another aspect, a dampener has a compression set percent of less than or equal to 35%.

According to another aspect, a flywheel is operably coupled to a drive shaft of s motor assembly. The flywheel extends through a casing and an opening in a dampener to engage the drive shaft.

According to another aspect, a casing is constructed of plastic.

According to another aspect, an airway clearance therapy system includes a blower and an air pulse generator operably coupled to the blower. The air pulse generator includes a casing defining an interior chamber, first and second pistons disposed within the interior chamber, and a connector assembly coupled to the first and second pistons. A first connecting rod is coupled to the first piston, and a second connecting rod is coupled to the second piston. The first connecting rod is coupled to the second connecting rod. The air pulse generator also includes dampening pads disposed between the connector assembly and the the first and second pistons, respectively. A motor assembly is operably coupled to the connector assembly. The connector assembly translates rotational motion from the motor assembly to linear motion of the first and second pistons to generate air pulses. A dampener is disposed between the motor assembly and the casing to reduce vibrations transferred between the motor assembly and the casing.

According to another aspect, first and second connecting rods are coupled to first and second pistons, respectively, via hinge assemblies. Each hinge assembly has a hinge base. The dampening pads have shapes that correspond with shapes of the hinge bases, respectively.

According to another aspect, a motor assembly includes a motor and a bracket. A dampener is coupled to an engagement surface of the bracket.

According to another aspect, a dampener defines a shape that corresponds to a shape of an engagement surface.

According to another aspect, a flywheel is operably coupled to a connector assembly and a motor assembly. A dampener defines an opening. The flywheel extends through the opening to engage the motor assembly.

According to another aspect, first and second pistons define a recessed region. Dampening pads are disposed within the recessed regions, respectively.

According to another aspect, dampening pads and a dampener are constructed of silicone with a compression set percent of less than or equal to 35%.

According to another aspect, a garment is fluidly coupled to an interior chamber via tubing. Air pulses generated by movement of first and second pistons are directed to the garment via the tubing.

According to another aspect, first and second pistons are operable between an expanded position and a retracted position. An air pulse generator is configured to hyper-inflate the garment with each air pulse generated from the first and second pistons moving from the expanded position to the retracted position.

According to another aspect, first and second pistons are configured to perform twenty cycles per second.

According to another aspect, first and second connecting rods are configured to move horizontally and vertically.

According to another aspect, wherein first and second connecting rods rotate about an axis, respectively. Movement of each of the first and second connecting rods relative to the axis is less than 5°, respectively.

According to another aspect, first and second connecting rods are configured to move about an elliptical path in response to rotation by the motor.

According to another aspect, an air pulse generator includes a turn shaft coupled to first and second connecting rods and a flywheel coupled to a motor assembly. Rotation from the motor assembly is transferred to a connector assembly via the flywheel and the turn shaft. The turn shaft guides movement paths for the first and second connecting rods.

According to another aspect, a means for proving airway clearance therapy includes a blowing means and an air pulse generation means operably coupled to the blowing means. The air pulse generation means includes a casing defining an interior chamber, first and second pulsing means disposed within the interior chamber, and a connector means coupled to the first and second pulsing means. A first connecting means is coupled to the first pulsing means, and a second connecting means is coupled to the second pulsing means. The first connecting means is coupled to the second connecting means. The air pulse generation means also includes dampening means disposed between the connector means and each of the first and second pulsing means. A driving means is operably coupled to the connector means. The connector means translates rotational motion from the driving means to linear motion of the first and second pulsing to generate air pulses. A dampener means is disposed between the driving means and the casing to reduce vibrations transferred between the driving means and the casing.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Related applications, for example, those listed herein, are fully incorporated by reference. Assertions within the related applications are intended to contribute to the scope and interpretation of the information disclosed herein. Any changes between any of the related applications and the present disclosure are not intended to limit the scope or interpretation of the information disclosed herein, including the claims. Accordingly, the present application includes the scope and interpretation of the information disclosed herein as well as the scope and interpretation of the information in any or all of the related applications.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An air pulse generator for a patient therapy system, comprising:
- a casing;
- first and second pistons disposed within the casing;
- a connector assembly coupled to each of the first and second pistons, the connector assembly including:
  - a first connecting rod coupled to the first piston via a first hinge assembly;
  - a first dampening pad disposed between the first piston and the first hinge assembly to reduce vibration translation between the first hinge assembly and the first piston;
  - a second connecting rod coupled to the second piston via a second hinge assembly; and
  - a second dampening pad disposed between the second piston and the second hinge assembly to reduce vibration translation between the second hinge assembly and the second piston; and
- a motor assembly operably coupled to the connector assembly, wherein the motor assembly drives movement of the first and second connecting rods to, consequently, drive motion of the first and second pistons to oscillate air within the casing.

2. The air pulse generator of claim 1, wherein the first and second pistons are configured to move linearly between an expanded position and a retracted position.

3. The air pulse generator of claim 1, wherein the motor assembly includes a bracket for coupling the motor assembly to the casing, and wherein a dampener is coupled between the bracket and the casing, and wherein a shape of the dampener corresponds with a shape of an engagement surface of the bracket.

4. The air pulse generator of claim 1, wherein the first and second pistons each define a recessed region, and wherein the first and second dampening pads are disposed within the recessed regions, respectively, and further wherein a shape of the dampening pads corresponds with a perimeter shape of a base of the first and second hinge assemblies, respectively.

5. The air pulse generator of claim 1, wherein the first and second connecting rods are configured to move in elliptical paths in response to rotation from the motor assembly.

6. The air pulse generator of claim 1, further comprising:
- a turn shaft disposed within an opening in each of the first and second connecting rods, wherein the turn shaft is operably coupled to the motor assembly via a flywheel.

7. An air control assembly for an airway clearance system, comprising:
- a casing;
- first and second pistons disposed within the casing;
- a connector assembly coupled to each of the first and second pistons; and
- a motor assembly operably coupled to the connector assembly, wherein the motor assembly includes:
- a motor operably coupled to the connector assembly, wherein the connector assembly is configured to translate rotational motion from the motor to linear motion of the first and second pistons between expanded and retracted positions to oscillate air within the casing;
- a bracket coupled to the motor;
- and a dampener disposed between the bracket and the casing to reduce translation of vibrations caused by the motor to reduce noise generation;
- wherein the connector assembly includes:
- a first connecting rod coupled to the first piston via a first hinge assembly;
- a second connecting rod coupled to the second piston via a second hinge assembly; and
- dampening pads disposed between the connector assembly and each of the first and second pistons to reduce vibration translation between the connector assembly and the first and second pistons, respectively.

8. The air control assembly of claim 7, wherein each of the first and second pistons defines a recessed region, and wherein the dampening pads are disposed within the recessed regions, respectively.

9. The air control assembly of claim 7, wherein the dampener has a compression set percent of less than or equal to 35%.

10. The air control assembly of claim 7, further comprising:

a flywheel operably coupled to a drive shaft of the motor assembly, wherein the flywheel extends through the casing and an opening in the dampener to engage the drive shaft.

11. An airway clearance therapy system, comprising:

a blower;

an air pulse generator operably coupled to the blower, the air pulse generator including:

a casing defining an interior chamber;

first and second pistons disposed within the interior chamber a connector assembly coupled to the first and second pistons, wherein a first connecting rod is coupled to the first piston and a second connecting rod is coupled to the second piston, and wherein the first connecting rod is coupled to the second connecting rod; and dampening pads disposed between the connector assembly and the first and second pistons, respectively;

a motor assembly operably coupled to the connector assembly, wherein the connector assembly translates rotational motion from the motor assembly to linear motion of the first and second pistons to generate air pulses; and a dampener is disposed between the motor assembly and the casing to reduce vibrations transferred between the motor assembly and the casing.

12. The airway clearance therapy system of claim 11, wherein the first and second connecting rods are coupled to the first and second pistons, respectively, via a hinge assembly, and wherein each hinge assembly has a hinge base, and wherein the dampening pads have shapes that correspond with shapes of the hinge bases, respectively.

13. The airway clearance therapy system of claim 11, wherein the motor assembly includes a motor and a bracket, and wherein the dampener is coupled to an engagement surface of the bracket.

14. The airway clearance therapy system of claim 13, wherein the dampener defines a shape that corresponds to a shape of the engagement surface.

15. The airway clearance therapy system of claim 11, wherein each of the dampening pads and the dampener is constructed of silicone with a compression set percent of less than or equal to 35%.

16. The airway clearance therapy system of claim 11, further comprising:

a garment fluidly coupled to the interior chamber via tubing, and wherein the air pulses generated by movement of the first and second pistons are directed to the garment via the tubing.

17. The airway clearance therapy system claim 16, wherein the first and second pistons are operable between an expanded position and a retracted position, and wherein the air pulse generator is configured to hyper-inflate the garment with each air pulse generated from the first and second pistons moving from the expanded position to the retracted position.

18. The airway clearance therapy system of claim 11, wherein each of the first and second connecting rods is configured to move horizontally and vertically, and wherein each of the first and second connecting rods rotates about a respective axis, and further wherein movement of each of the first and second connecting rods relative to the axis is less than 5°, respectively.

19. The airway clearance therapy system of claim 11, wherein the air pulse generator includes:

a turn shaft coupled to each of the first and second connecting rods; and a flywheel coupled to the motor assembly, wherein rotation from the motor assembly is transferred to the connector assembly via the flywheel and the turn shaft, and wherein the turn shaft guides movement paths for the first and second connecting rods.

* * * * *